United States Patent
Burrows et al.

(10) Patent No.: US 11,427,267 B2
(45) Date of Patent: Aug. 30, 2022

(54) DEPLOYABLE FAIRING SYSTEM FOR USE WITH VEHICLES

(71) Applicant: XSTREAM TRUCKING INC., Redwood City, CA (US)

(72) Inventors: Daniel Burrows, San Mateo, CA (US); Burk Kladde, Chandler, AZ (US); Dagan Trnka, Durham, NC (US); Ada Sierraalta, San Francisco, CA (US); Roger LeMesurier, San Francisco, CA (US); Adam Baumgartner, San Mateo, CA (US); Pratik Bhagwat, Phoenix, AZ (US)

(73) Assignee: TRUCKLABS, INC., Redwood City, CA (US)

( * ) Notice: Subject to any disclaimer, the term of this patent is extended or adjusted under 35 U.S.C. 154(b) by 243 days.

(21) Appl. No.: 16/810,598

(22) Filed: Mar. 5, 2020

(65) Prior Publication Data

US 2020/0307724 A1 Oct. 1, 2020

Related U.S. Application Data

(60) Provisional application No. 62/814,725, filed on Mar. 6, 2019.

(51) Int. Cl.
*B62D 35/00* (2006.01)
*B62D 53/08* (2006.01)

(52) U.S. Cl.
CPC .......... *B62D 35/001* (2013.01); *B62D 53/08* (2013.01)

(58) Field of Classification Search
CPC .............................. B62D 35/001; B62D 53/08
See application file for complete search history.

(56) References Cited

U.S. PATENT DOCUMENTS

| 3,241,876 A | 3/1966 | Selden |
| 3,486,464 A | 12/1969 | Dean et al. |

(Continued)

FOREIGN PATENT DOCUMENTS

| CA | 2431380 A1 | 12/2003 |
| DE | 3248122 A1 | 7/1984 |

(Continued)

OTHER PUBLICATIONS

Ang-Olson et al., "Energy Efficiency Strategies for Freight Trucking: Potential Impact on Fuel Use and Greenhouse Gas Emissions," Transportation Research Record 1815, Paper No. 02-3877, pp. 11-18, Jan. 1, 2002.

(Continued)

*Primary Examiner* — Lori L Lyjak
(74) *Attorney, Agent, or Firm* — Cozen O'Connor

(57) ABSTRACT

Systems and methods are disclosed for providing a deployable fairing system to a tractor trailer. The deployable fairing system includes an actuator used to extend the deployable fairing from an unextended configuration to an extended configuration to occupy a portion of a gap area that exists between a tractor and an attached trailer. The deployable fairing includes deployable upper and/or lower horizontal assemblies that are pivotally coupled to a frame attached to the tractor/cab, and two side panels that are pivotally coupled to one or both of the upper and lower horizontal assemblies. The deployable upper and lower horizontal assemblies and the two side panels fold in on one another along multiple hinged axes in the unextended configuration, and extend rearward from the top and sides of the tractor in the extended configuration to cover a portion of the gap. The fairing may advantageously flair from front to the rear.

22 Claims, 15 Drawing Sheets

(56) References Cited

U.S. PATENT DOCUMENTS

| | | | |
|---|---|---|---|
| 3,697,120 A | 10/1972 | Saunders | |
| 3,711,146 A | 1/1973 | Madzsar et al. | |
| 3,934,923 A | 1/1976 | Lissaman et al. | |
| 3,977,715 A | 8/1976 | Casci | |
| 3,977,716 A | 8/1976 | Whited | |
| 4,036,519 A | 7/1977 | Servais et al. | |
| 4,193,629 A | 3/1980 | Merkle | |
| 4,290,639 A | 9/1981 | Herpel | |
| 4,311,334 A | 1/1982 | Jenkins | |
| 4,343,505 A | 8/1982 | Levassor | |
| 4,397,496 A | 8/1983 | Drygas | |
| 4,457,558 A | 7/1984 | Ishikawa | |
| 4,462,628 A | 7/1984 | Gregg | |
| 4,518,188 A | 5/1985 | Witten | |
| 4,611,847 A | 9/1986 | Sullivan | |
| 4,685,715 A | 8/1987 | Hardin | |
| 4,693,506 A | 9/1987 | Massengill | |
| 4,746,160 A | 5/1988 | Wiesemeyer | |
| 4,750,772 A | 6/1988 | Haegert | |
| 4,883,307 A | 11/1989 | Hacker et al. | |
| 4,904,015 A | 2/1990 | Haines | |
| 4,932,716 A | 6/1990 | Marlowe et al. | |
| 5,078,448 A | 1/1992 | Selzer et al. | |
| 5,222,438 A | 6/1993 | Ende | |
| 5,498,059 A | 3/1996 | Switlik | |
| 5,522,637 A | 6/1996 | Spears | |
| 5,658,038 A | 8/1997 | Griffin | |
| 6,213,531 B1 | 4/2001 | Corey et al. | |
| 6,246,948 B1 | 6/2001 | Thakker | |
| 6,257,654 B1 | 7/2001 | Boivin et al. | |
| 6,428,084 B1 | 8/2002 | Liss | |
| 6,485,087 B1 | 11/2002 | Roberge et al. | |
| 6,527,334 B2 | 3/2003 | Oliver | |
| 6,585,312 B2 | 7/2003 | Jain | |
| 6,799,793 B1 | 10/2004 | Sladen | |
| 6,846,035 B2 | 1/2005 | Wong et al. | |
| 6,886,882 B2 | 5/2005 | Farlow et al. | |
| 6,932,419 B1 | 8/2005 | McCullough | |
| 7,374,229 B1 | 5/2008 | Noll et al. | |
| 7,374,230 B2 | 5/2008 | Breidenbach | |
| 7,618,086 B2 | 11/2009 | Breidenbach | |
| 7,712,822 B2 | 5/2010 | Pfaff | |
| 7,850,224 B2 | 12/2010 | Breidenbach | |
| 8,083,284 B1 | 12/2011 | Logounov | |
| 8,100,461 B2 | 1/2012 | Smith et al. | |
| 8,272,680 B2 | 9/2012 | Breidenbach | |
| 8,360,509 B2 | 1/2013 | Smith et al. | |
| 8,480,162 B2 | 7/2013 | Breidenbach | |
| 8,608,228 B2 | 12/2013 | Visentin | |
| 8,630,510 B2 | 1/2014 | Giuffrida et al. | |
| 8,708,399 B2 | 4/2014 | Smith et al. | |
| 8,876,191 B2 | 11/2014 | Breidenbach | |
| 9,027,983 B2 | 5/2015 | Butler et al. | |
| 9,039,069 B2 | 5/2015 | Smith et al. | |
| 9,145,177 B2 | 9/2015 | Smith et al. | |
| 9,168,959 B2 | 10/2015 | Smith et al. | |
| 9,333,993 B2 | 5/2016 | Telnack | |
| 9,346,496 B2 | 5/2016 | Breidenbach | |
| 9,440,688 B2 | 9/2016 | Smith et al. | |
| 9,440,689 B1 | 9/2016 | Smith et al. | |
| 9,457,847 B2 | 10/2016 | Smith et al. | |
| 9,505,449 B2 | 11/2016 | Telnack | |
| 9,540,054 B2 | 1/2017 | Butler et al. | |
| 9,645,577 B1 | 5/2017 | Frazzoli et al. | |
| 10,569,815 B2 | 2/2020 | Boivin et al. | |
| 11,110,974 B2 | 9/2021 | Cosme et al. | |
| 2004/0119319 A1 | 6/2004 | Reiman et al. | |
| 2004/0239146 A1 | 12/2004 | Ortega et al. | |
| 2007/0200390 A1 | 8/2007 | Lotarev et al. | |
| 2008/0231434 A1 | 9/2008 | Hermann | |
| 2008/0266135 A1 | 10/2008 | Curtis | |
| 2009/0076700 A1 | 3/2009 | Radpour | |
| 2009/0184539 A1 | 7/2009 | Pursley | |
| 2009/0200834 A1 | 8/2009 | Vogel et al. | |
| 2010/0072779 A1* | 3/2010 | Pfaff | B62D 35/001 296/180.2 |
| 2010/0194143 A1 | 8/2010 | Perkins et al. | |
| 2010/0201152 A1 | 8/2010 | Smith | |
| 2011/0015809 A1 | 1/2011 | Hermann | |
| 2011/0068602 A1 | 3/2011 | Burrows | |
| 2011/0084516 A1 | 4/2011 | Smith et al. | |
| 2011/0153116 A1 | 6/2011 | Bedingfield et al. | |
| 2012/0139290 A1 | 6/2012 | Kenevan | |
| 2013/0238198 A1 | 9/2013 | Prentice | |
| 2014/0176717 A1 | 6/2014 | De Paschoal | |
| 2014/0367993 A1 | 12/2014 | Breidenbach | |
| 2015/0035312 A1 | 2/2015 | Grandominico et al. | |
| 2015/0197292 A1 | 7/2015 | Smith et al. | |
| 2015/0239512 A1 | 8/2015 | Smith et al. | |
| 2015/0266520 A1 | 9/2015 | Breidenbach | |
| 2015/0274220 A1 | 10/2015 | Telnack | |
| 2015/0291231 A1 | 10/2015 | Smith et al. | |
| 2015/0321706 A1 | 11/2015 | Smith | |
| 2015/0321707 A1 | 11/2015 | Menicovich et al. | |
| 2015/0360735 A1 | 12/2015 | Butler et al. | |
| 2016/0096559 A1 | 4/2016 | Traylor | |
| 2016/0129951 A1 | 5/2016 | Park | |
| 2016/0185400 A1 | 6/2016 | Martinus et al. | |
| 2016/0194037 A1 | 7/2016 | Logounov | |
| 2018/0148107 A1* | 5/2018 | Burrows | B62D 37/02 |
| 2018/0370581 A1 | 12/2018 | Williams et al. | |
| 2019/0185075 A1 | 6/2019 | Boivin et al. | |
| 2019/0283813 A1 | 9/2019 | Smith et al. | |
| 2021/0339806 A1 | 11/2021 | Weber et al. | |

FOREIGN PATENT DOCUMENTS

| | | | | |
|---|---|---|---|---|
| DE | 19842994 A1 | 4/2000 | | |
| EP | 1870320 A2 | 12/2007 | | |
| GB | 2146597 B | 1/1987 | | |
| JP | 5248460 A | 9/1993 | | |
| JP | 2018116429 A * | 7/2018 | | B60W 50/082 |
| RU | 2678760 C2 * | 1/2019 | | G01F 23/0076 |
| WO | 2008024386 A2 | 2/2008 | | |
| WO | 2018102422 A1 | 6/2018 | | |
| WO | WO-2018102422 A1 * | 6/2018 | | B62D 35/001 |
| WO | 2021226143 A1 | 11/2021 | | |

OTHER PUBLICATIONS

Burrows et al., "Deployable Fairing for Use With Vehicles," Amendment filed Jun. 4, 2018, for U.S. Appl. No. 15/832,315, 12 pages.

Burrows et al., "Deployable Fairing for Use With Vehicles," Office Action dated Apr. 12, 2018, for U.S. Appl. No. 15/832,315, 12 pages.

Burrows et al., "Deployable Fairing for Use With Vehicles," Office Action dated Sep. 12, 2019, for U.S. Appl. No. 16/183,507, 7 pages.

Burrows, "System, Method and Article for Use With Coupled Vehicles," Amendment, filed on Oct. 12, 2011, for U.S. Appl. No. 12/563,426, 15 pages.

International Search Report and Written Opinion of the International Searching Authority, dated Mar. 14, 2018, for International Application No. PCT/US2017/063728, 76 pages.

Office Action, dated Jul. 12, 2011, for U.S. Appl. No. 12/563,426, Burrows, "System, Method and Article for Use With Coupled Vehicles," 12 pages.

Telnack, "Self-Deploying Apparatuses, Assemblies, and Methods for Drag Reduction of Land Vehicles," Amendment, filed on Feb. 28, 2017, for U.S. Appl. No. 15/151,214, 8 pages.

* cited by examiner

DEPLOYABLE FAIRING SYSTEM FOR USE WITH VEHICLES

TECHNICAL FIELD

The present disclosure generally relates to vehicles, for example tractor trailer combinations, and more particularly with deployable fairing systems to enhancing fuel economy of vehicles, for example coupled vehicles.

BACKGROUND

Description of the Related Art

Vehicles move a large number of people and cargo. Often two or more vehicles are physically coupled together to move freight or other cargo, people, and/or animals.

A ubiquitous example of coupled vehicles is that of the tractor-trailer or semi-trailer combination, which employs a tractor, sometimes referred to as a primary mover, coupled to pull one or more trailers. Such tractor-trailers or semis come in a large variety of forms and are typically used to move freight over relatively long distances. The tractor is the drive mechanism that pulls or pushes the trailer. The tractor includes the engine, typically an internal combustion diesel engine, a transmission and drive wheels. The tractor typically includes a cab where the driver or operator sits to operate the tractor. The tractor may also include a sleep cab which provides accommodations for the driver or operator when not in motion. The trailers are typically removably coupled to the tractor via a coupler such as a fifth wheel carried by the tractor and kingpin carried by the trailer, or less commonly via an automatic coupling. A semi-trailer typically does not have a front axle, relying on the tractor for support of a portion of the trailer's weight, and may have one or typically more rear axles. In some instances, a tractor may pull multiple trailers, forming a train. In such a case, the following trailer(s) may not have front axels and may rely on the proceeding trailers for supporting a portion of the trailer's weight. Trailers come in a large variety, for example box, bus, curtain side, flatbed, "low boy", refrigerated or "reefer", tanker, dry bulk, car carrier, drop deck, "double decker" or sidelifter. Trailers are often substantially rectangular, having a front end which is coupled to the tractor and a back end spaced remotely from the tractor. The back end often includes a door or more commonly a pair of doors to provide access to an interior of the trailer from an exterior thereof. The front end, back end, and sides of a trailer tend to be vertically extending surfaces. In some instances, a portion of a trailer or an accessory thereof may extend horizontally from these vertically extending surfaces, for example a refrigeration system or heater or nose cone may extend forward from the front of a trailer in to a gap region between a tractor and coupled trailer.

Another example of coupled vehicles is railroad trains. Rail road trains typically include one or more locomotives that pull a number of cars along a set of tracks. The cars may include passenger cars and/or freight cars. The freight cars can take a large variety of forms, similar in some respects to the various types of trailers.

Tractor-trailers or semis and railroad trains are increasingly used to move containerized cargo. This multi-modal approach allows containerized cargo to be conveniently moved between ships (e.g., ocean going container ships, barges), tractor trailers, and/or railroad trains. For instance, containers may arrive by ship from overseas. Tractor-trailers may move some of the containers over roads to warehouses or to retail locations. Tractor-trailers may move some of the containers to rail yards. Some containers may be moved via railroad trains, and subsequently moved to a desired location via tractor-trailers.

Coupled vehicles typically must be capable of operating in a variety of environments. For example, coupled vehicles must be capable of carrying loads at relatively high speed over long distance. For instance, tractor-trailer combinations typically must be able to haul freight over highways such as toll roads or freeways within some posted speed limit. Such highways are typically relatively straight over long distances, and do not require much turning or maneuvering. Such tractor-trailers typically must also be able to haul freight over surface streets at much lower posted speed limits. Travel over surface streets typically requires higher maneuverability than travel over highways, often requiring essentially right angle turns in relatively confined spaces or navigating steep elevational changes.

Fuel efficiency is typically an important concern when operating coupled vehicles. A large portion of the cost of moving freight or people is attributable to fuel costs and the majority of fuel at highway speeds is spent overcoming aerodynamic drag. Fuel efficiency tends to decrease as speed increases. Fuel efficiency while traveling on highways is particularly a concern since the average speed is higher than on surface roads and, for most operations, more time is spent on highways than on surface streets.

Numerous approaches have been suggested for increasing fuel efficiency of vehicles. These approaches typically employ ferrules, fairings, cowlings, air dams, deflectors, and/or spoilers located at various locations, for instance on a front of the tractor or over a roof of the tractor. Some approaches for increasing fuel efficiency specifically address the problem created by the fact that there is a gap between the tractor and trailer. Some of the approaches for increasing fuel efficiency are illustrated in U.S. Pat. Nos. 3,697,120; 3,711,146; 3,934,923; 4,036,519; 4,750,772; 5,078,448; and 6,585,312.

BRIEF SUMMARY

Deployable fairing systems are disclosed that enhance fuel efficiency of vehicles (e.g., coupled vehicles), yet which adapt to a current situation (e.g., type of trailer or specific physical configuration of trailer) and/or adapt to current conditions (e.g., climate, wind speed, wind direction, temperature of ambient environment).

A deployable fairing system may be summarized as including: a deployable fairing which is deployable into a plurality of fairing configurations from a fully retracted configuration to a fully deployed configuration, and at least one intermediate configuration between the fully retracted configuration and the fully deployed configuration; at least one actuator drivingly coupled to move the deployable fairing into the plurality of fairing configurations; at least one sensor position to sense at least one condition; and a controller communicatively coupled to the at least one sensor to receive information representative of the at least one condition, and communicatively couple to control the at least one actuator in response to at least the at least one condition to deploy the deployable faring into at least one intermediate configuration between the fully retracted configuration and the fully deployed configuration and to stop deploying the deployable faring with the deployable faring in the at least one intermediate configuration.

The deployable fairing may have a proximate end and a distal end, the proximate end attached to a rear of a vehicle, the distal end spaced at least relatively proximate the rear of the vehicle in the fully retracted configuration and spaced relatively remote from the rear of the vehicle in the fully deployed configuration. The vehicle may be a trailer, the proximate end of the deployable fairing attached to the rear of the trailer, the distal end of the deployable fairing extending rearwardly of the rear of the trailer as a rear tail in the intermediate and the fully deployed configurations. The vehicle may be a tractor, the proximate end of the deployable fairing attached to the rear of a cab of the tractor, the distal end of the deployable fairing extending rearwardly of the rear of the cab of the tractor as a gap filler in the intermediate and the fully deployed configurations. In the fully deployed configuration the deployable fairing may extend into a gap region which encompasses a volume between a back of the cab of the tractor and a front of a trailer coupled to the tractor via a fifth wheel of the tractor and a kingpin of the trailer, and which extends upwards above a set of drive wheels of the tractor.

The at least one sensor may be responsive to at a presence or an absence of an object in a direction in which the deployable fairing moves in transitioning toward the fully deployed configuration from the fully retracted configuration. The at least one sensor may be responsive to at a presence or an absence of an object in a direction in which the deployable fairing moves in transitioning toward the fully deployed configuration from the fully retracted configuration.

The controller may include at least one processor and may determine the presence or the absence of a portion of the trailer in the deployed region based at least in part on the information received via the at least one sensor. For example, the controller may determine the presence or the absence of one or more of a cooling unit, a heating unit or a nose cone that extends forward from a vertically extending front of the trailer into the gap region.

The controller may determine an amount of deployment based at least in part on a position of an object that is present in the direction in which the deployable fairing moves in transitioning toward the fully deployed configuration from the fully retracted configuration. The controller may determine an amount of deployment based at least in part on a distance to an object that is present in the direction in which the deployable fairing moves in transitioning toward the fully deployed configuration from the fully retracted configuration to deploy the deployable fairing as close to the fully deployed configuration without contacting the object. The controller may determine an amount of deployment based at least in part on a distance to an object that is present in the direction in which the deployable fairing moves in transitioning toward the fully deployed configuration from the fully retracted configuration to deploy the deployable fairing as close to the fully deployed configuration with a defined offset without contacting the object.

The at least one sensor may be responsive to at least one of wind speed or wind direction. For example, the at least one sensor may be responsive to a wind direction that is non-parallel to an axis of deployment along with the deployable fairing moves in transitioning between the fully retracted and the fully deployed configurations. The controller may determine an amount of deployment based at least in part on at least one of the wind speed or the wind direction.

The at least one sensor may be responsive to a temperature in an ambient environment. The controller may determine an amount of deployment based at least in part on the temperature in the ambient environment.

The at least one sensor may include at least a first sensor that is responsive to at a presence or an absence of an object in a direction in which the deployable fairing moves in transitioning toward the fully deployed configuration from the fully retracted configuration, and at least a second sensor that is response to at least one of a wind speed, a wind direction or a temperature in an ambient environment. The controller may determine an amount of deployment based at least in part on a position of an object that is present in the direction in which the deployable fairing moves in transitioning toward the fully deployed configuration from the fully retracted configuration and based at least in part on one or more of: the wind speed, the wind direction, or the temperature in the ambient environment.

A method of operation in a deployable fairing system may be summarized as including: receiving by the controller information representative of the at least one condition from the at least one sensor; determining by the controller an amount of deployment for the deployable fairing based at least one part on the received information; and providing signals by the controller to cause at least one actuator to move the deployable fairing into one of the faring configurations that corresponds to the determined amount of deployment.

The method may further include: providing signals by the controller to move the distal end of the deployable fairing to a first position spaced at least relatively proximate the rear of the vehicle in the fully retracted configuration; and providing signals by the controller to move the distal end of the deployable fairing to a second position spaced relatively remote from the rear of the vehicle in the fully deployed configuration.

Providing signals by the controller to move the distal end of the deployable fairing to a second position spaced relatively remote from the rear of the vehicle in the fully deployed configuration may include providing signals to the at least actuator to move the distal end of the deployable fairing to extend rearwardly of the rear of the trailer as a rear tail in the intermediate and the fully deployed configurations.

Providing signals by the controller to move the distal end of the deployable fairing to a second position spaced relatively remote from the rear of the vehicle in the fully deployed configuration may include providing signals to the at least one actuator to move the distal end of the deployable fairing to extend rearwardly of the rear of the cab of the tractor as a gap filler in the intermediate and the fully deployed configurations.

Receiving by the controller information representative of the at least one condition from the at least one sensor may include receiving information representative of the presence or the absence of any objects in the direction in which the deployable fairing moves in transitioning toward the fully deployed configuration from the fully retracted configuration.

The method may further include determining a relative position of or a relative distance to any objects that are present. The method may further include determining a relative position of or a relative distance to any objects that are present.

Determining an amount of deployment may include determining an amount of deployment that moves the fully deployed configuration as close to the fully deployed configuration without contacting any objects. Determining an amount of deployment may include determining an amount of deployment that moves the deployable fairing as close to the fully deployed configuration with a defined offset without contacting any objects. Such may include determining an amount of deployment that moves the fully deployed configuration into the one of the intermediate configurations that is as close to the fully deployed configuration as possible without contacting any objects.

Receiving information representative of the at least one condition from the at least one sensor may include receiving information representative of at least one of wind speed or wind direction. For example the information may be representative of the wind direction that is non-parallel to the axis of deployment. Determining an amount of deployment may include determining an amount of deployment based at least in part on at least one of the wind speed or the wind direction. For example, the determined amount of deployment may be based at least in part on the wind direction that is non-parallel to the axis of deployment.

The received information may be representative of the temperature in the ambient environment. Determining an amount of deployment may include determining an amount of deployment based at least in part on the temperature in the ambient environment.

The received information may be representative of the at least one condition from the at least one sensor includes receiving information representative of: the presence or the absence of objects, and at least one of one or more of: the wind speed, the wind direction, or the temperature in the ambient environment. Determining the amount of deployment may be based on at least in part on a position of an object that is present in the direction in which the deployable fairing moves in transitioning toward the fully deployed configuration from the fully retracted configuration and based at least in part on one or more of: the wind speed, the wind direction, or the temperature in the ambient environment.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

Figure 1A:
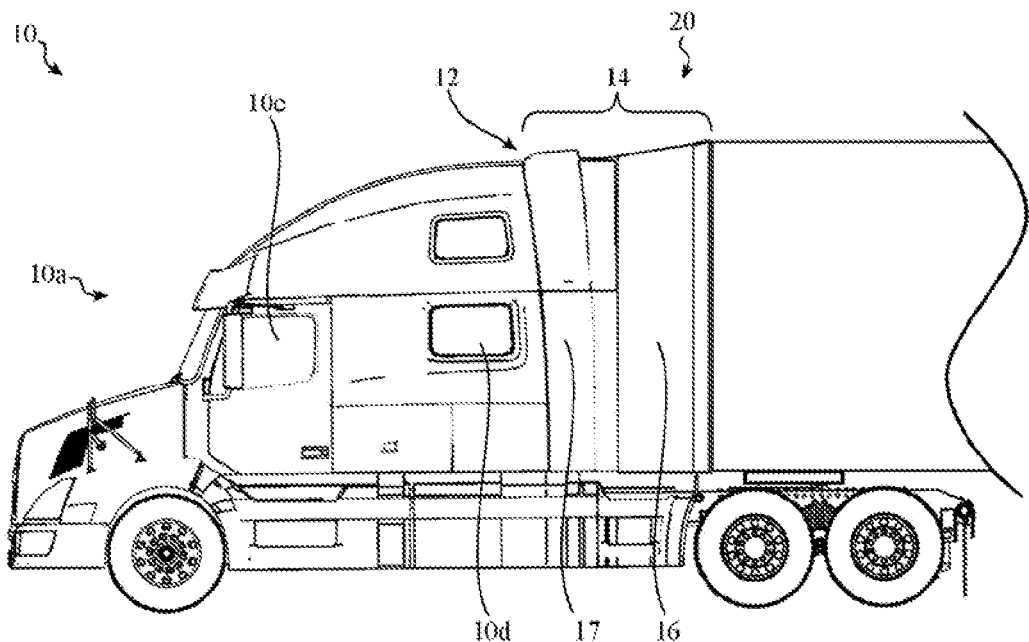
FIG. 1A is a left side elevational view of a coupled vehicle comprising a tractor and a trailer, and which employs deployable fairing to close a gap between the tractor and the trailer, according to one illustrated implementation, the deployable faring illustrated in a fully deployed configuration expanded proximate one of the vehicles.
Figure 1B:
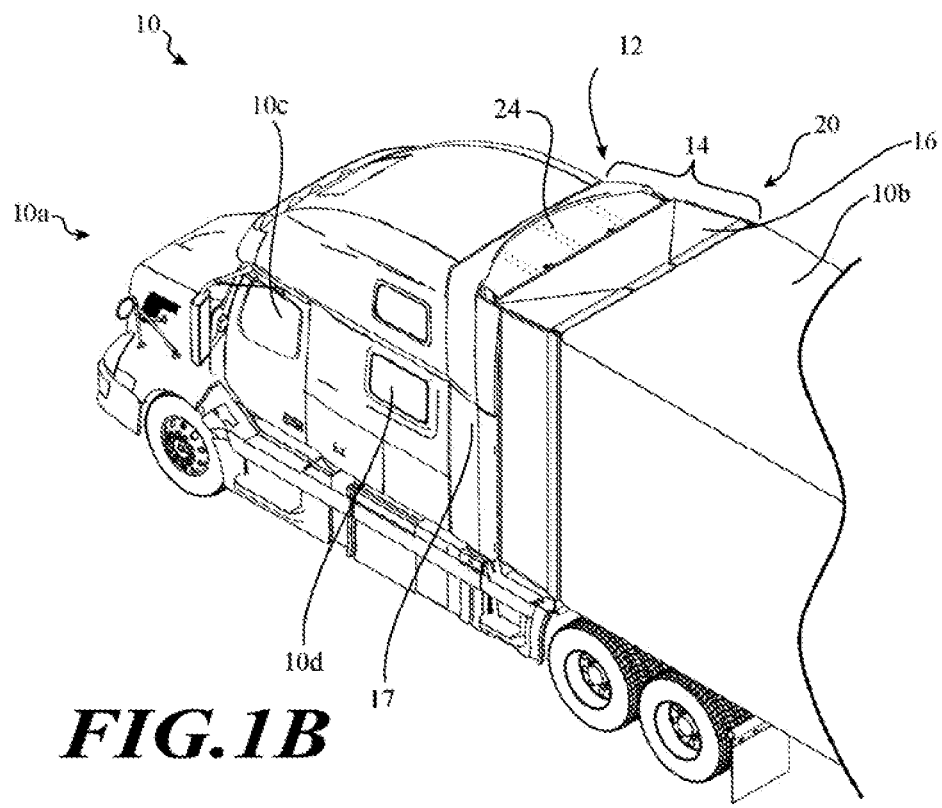
FIG. 1B is a rear, left side, isometric view of the coupled vehicle and deployable faring of FIG. 1A, the deployable faring illustrated in the fully deployed configuration.
Figure 1C:
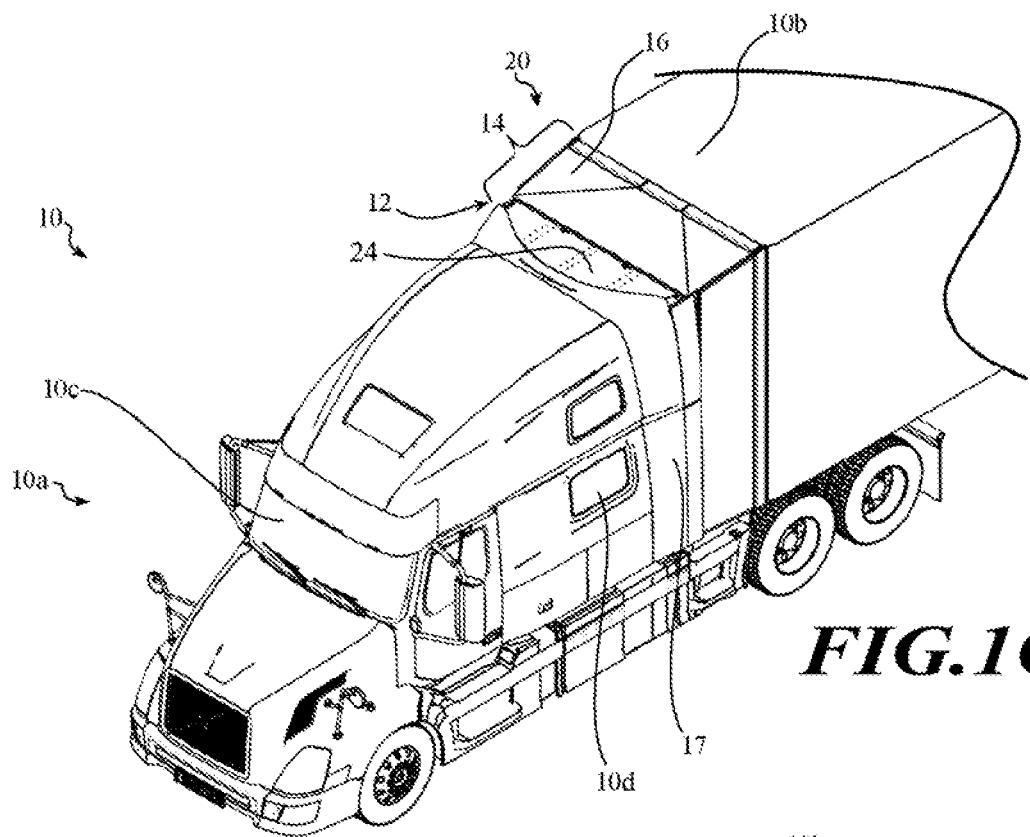
FIG. 1C is a front, left side, isometric view of the coupled vehicle and deployable faring of FIG. 1A, the deployable faring illustrated in the fully deployed configuration.
Figure 1D:
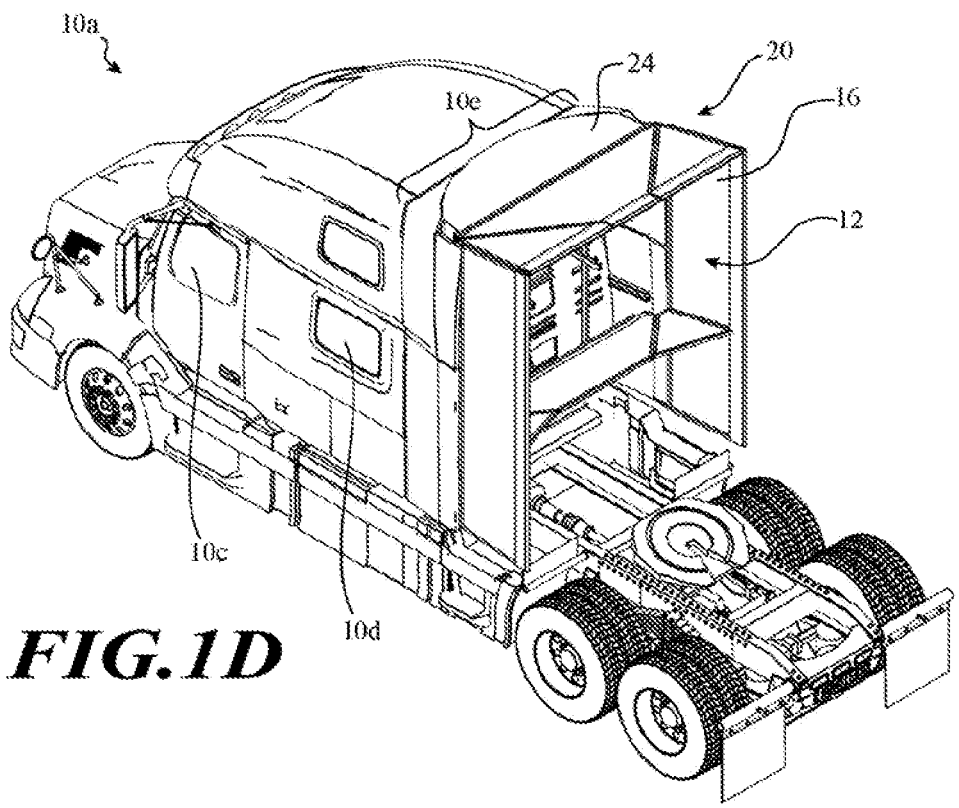
FIG. 1D is a rear, left side, isometric view of the tractor and deployable faring of FIG. 1A, the deployable faring illustrated in the fully deployed configuration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with coupled vehicles, for example tractor-trailer combinations, and with wireless communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "one implementation," "an embodiment," or "an implementation" means that a particular feature, structure or characteristic described in connection with the embodiment or implementation is included in at least one embodiment or one implementation. Thus, the appearances of the phrases "in one embodiment," "in one implementation," "in an embodiment," or "in one implementation" in various places throughout this specification are not necessarily all referring to the same embodiment or to the same implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

This disclosure describes various apparatus, methods and articles related to increasing fuel efficiency for coupled vehicles. While described in terms of a tractor-trailer combination, such may be used in conjunction with other coupled vehicles.

FIGS. 1A, 1B, 1C, and 1D show a vehicle 10 in the form of a coupled vehicle comprising a tractor 10a and a trailer 10b, and a deployable fairing system 12 with a deployable fairing 16 shown in a fully extended or fully deployed configuration 20, according to one illustrated implementation. FIGS. 2A, 2B, 2C, and 2D show the coupled vehicle 10 with the deployable fairing 16 in a fully retracted or fully un-deployed configuration 18, according to one illustrated implementation.

The vehicle 10 includes, for example, a lead vehicle, which in typical operation is at the front or ahead of a trailing vehicle with respect to a direction of travel during normal operation. It is recognized that in some instances, the lead vehicle may at times be behind the trailing vehicle, for example when backing up. In the illustrated implementation, the lead vehicle is the tractor 10a, which includes an engine (e.g., internal combustion diesel engine, not shown), a transmission (not shown), drive wheels, steering wheel, throttle (not shown), and brakes (not shown). The tractor 10a may be typical of those commonly used in long haul trucking within the United States, such as those manufactured and sold under the Kenworth and Peterbilt trademarks. The tractor 10a may include a cab 10c in which the driver or operator sits while driving or operating the tractor 10a. The tractor 10a may also include a sleeper cab 10d, located behind the cab 10c, which a driver or operator may use as a residence or sleep area when the tractor 10a is parked. The back of the tractor may have a width 10e. The tractor may have one or more ferrules, fairings, cowlings, air dams, deflectors, and/or spoilers located at various locations to reduce aerodynamic drag and thereby increase fuel efficiency.

The trailer 10b may take any of a variety of forms. For example, the trailer 10b may take the form of a semi-trailer, which includes a set of rear wheels, relying on the tractor 10a to support a portion of the weight of the trailer 10b at a front end of the trailer 10b, instead of having a front axle. The trailer 10b may take the form of a box trailer, or any variety of other types of trailers, for instance bus, curtain side, flatbed, "low boy", refrigerated or "reefer", tanker, dry bulk, car carrier, drop deck, "double decker" or sidelifter trailers. As illustrated the trailer typically has a front that extends substantially vertically, although one or more portions or objects may extend horizontally forward of from the front of the trailer, e.g., a cooler unit, a heater unit, a nose cone.

The trailer 10b is physically coupled to the tractor 10a. For example, the tractor 10a may carry a fifth wheel, to which the trailer 10b is removably or detachably physically coupled. Fifth wheels include metal plates skid plates and jaws on one vehicle, usually the tractor, and which receive a kingpin carried by the other vehicle, usually the trailer. Fifth wheels are commonly employed in tractor trailer combinations 10, so will not be described in detail. There may be additional couplings between the tractor 10a or components thereof and the trailer 10b or components thereof. For example, there may be one or more electrical couplings, pneumatic couplings and/or hydraulic couplings. Such may, for example, provide electrical power or signals to the trailer 10b or component thereof, for instance a refrigeration system, turn signal indicators and/or brake lights. Such may, for example, supply pressurized fluid or air to the trailer 10b or a component thereof, for instance brakes.

Notably, a gap region 14 exists between the tractor 10a and the trailer 10b. The gap region 14 is sufficiently large as to allow the tractor-trailer combination 10 to maneuver as need, for example through surface streets of a city of town.

For instance, the gap 14 may be approximately 1.5 meters or 4.5 feet in length. This gap region 14 negatively affects aerodynamic and hence hinders fuel efficiency, particularly at higher speeds such as highway speeds (e.g., 55-75 mph). Without being bound to such, Applicant believes that closing the gap 14 may result in an approximately 8% reduction in fuel costs.

As illustrated, the deployable fairing system 12 includes a deployable fairing 16 and optionally a static cab fairing 17. As previously noted, FIGS. 2A-2D illustrate the deployable fairing 16 in an extended or deployed configuration 20. In particular, the deployable fairing 16 does not extend the full length of the gap region 14 between the tractor 10a and trailer 10b in the un-deployed or unextended position or configuration 18, and in fact is preferably retracted to be close to the back of the cab 10c, 10d, for example against or proximate the static cab fairing 17. As previously noted, FIGS. 1A-1D illustrate the deployable fairing 16 in a fully deployed or fully extended position or configuration 20. In particular, the combination of the static cab fairing 17 and the deployable fairing 16 extends the full length or almost the full length of the gap region 14 between the tractor 10a and trailer 10b when the deployable fairing 16 is in the deployed or extended configuration or position 20. Thus, the combination of the static cab fairing 17 and the deployable fairing 16 extends over halfway, and preferably over three quarters of the way or over seven eighths of the way across the gap region 14.

As discussed in detail below, the deployable fairing system 12 can automatically selectively move the deployable fairing 16 between the un-deployed or unextended configuration or position 18 and the deployed or extended configuration or position 20 in response to, or based on, a speed or expected speed of at least one of the coupled vehicles 10a, 10b. Thus, the deployable fairing 16 may be in the fully deployed or fully extended configuration or position 20 when the tractor-trailer combination 10 is operating at relatively fast speeds or on roads or portions of roads where a posted speed limit is relatively fast or high. This can advantageously reduce aerodynamic drag, thereby increasing fuel efficiency. Likewise, the deployable fairing 16 may be in the fully un-deployed or fully unextended configuration or position 18 when the tractor-trailer combination 10 is operating at relatively slow speeds or on roads or portions of roads where a posted speed limit is relatively slow or low. This may advantageously improve maneuverability on such roads or during such times that maneuverability is most desired and when or where the gap 14 least adversely affects fuel efficiency. Further, the deployable fairing 16 may be placed in or constrained to in an intermediate configuration between the fully deployed or fully extended configuration or position 20 and the fully un-deployed or fully unextended configuration or position 18 based on the existence or absence of obstacles or obstructions in the gap region 14, for instance a portion of the trailer (e.g., refrigeration unit, heater unit, nose cone) that extends forward of the generally vertical front of the trailer. Additionally or alternatively, the deployable fairing 16 may be placed in or constrained to an intermediate configuration between the fully deployed or fully extended configuration or position 20 and the fully un-deployed or fully unextended configuration or position 18 based on one or more other conditions, for example wind speed, wind direction, temperature in the ambient environment or other environmental conditions.

Figure 2A:
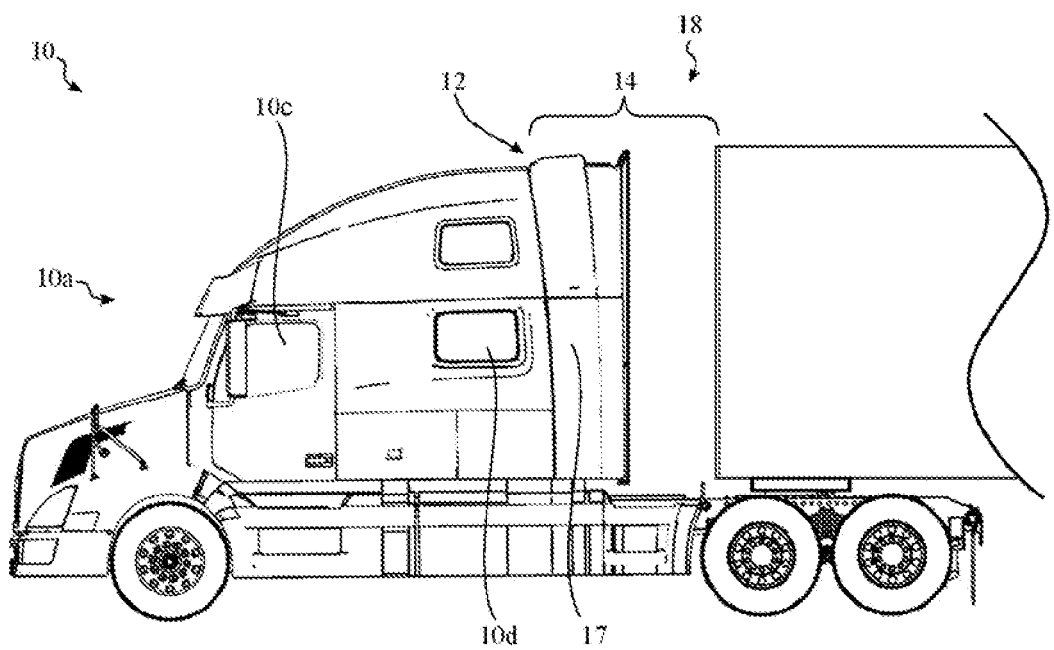
FIG. 2A is a left side elevational view of a coupled vehicle comprising a tractor and a trailer, and which employs deployable faring to close a gap between the tractor and the trailer, according to one illustrated implementation, the deployable faring illustrated in a fully retracted or un-deployed configuration retracted against one of the vehicles.
Figure 2B:
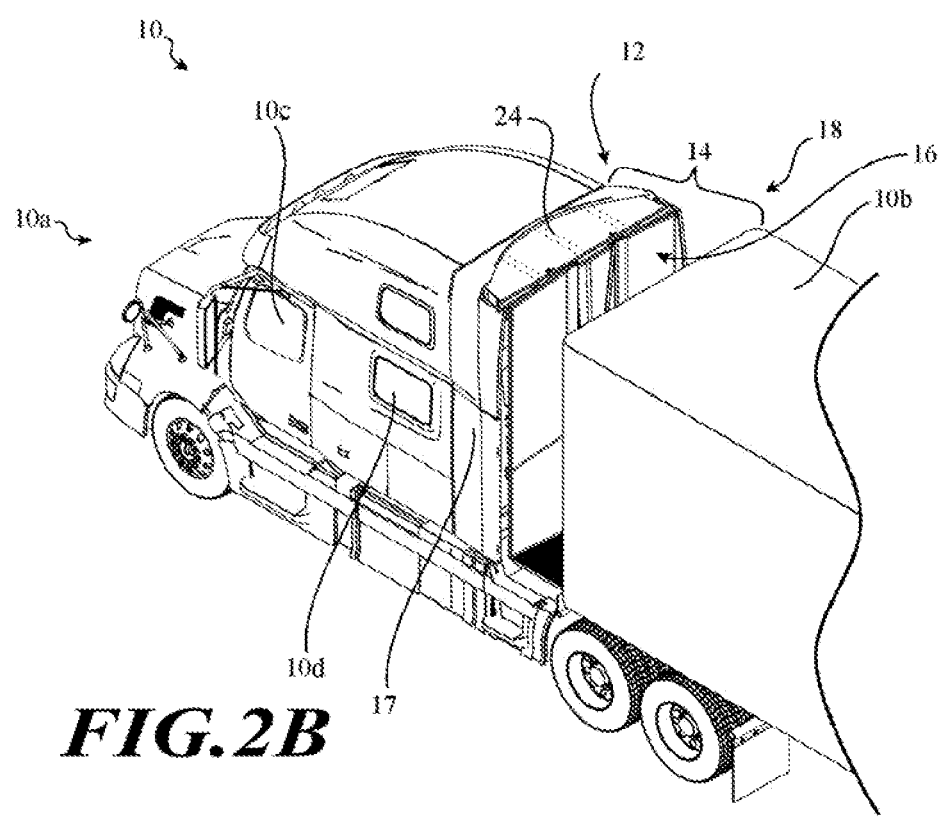
FIG. 2B is a rear, left side, isometric view of the coupled vehicle and deployable faring of FIG. 2A, the deployable faring illustrated in the fully retracted configuration.
Figure 2C:
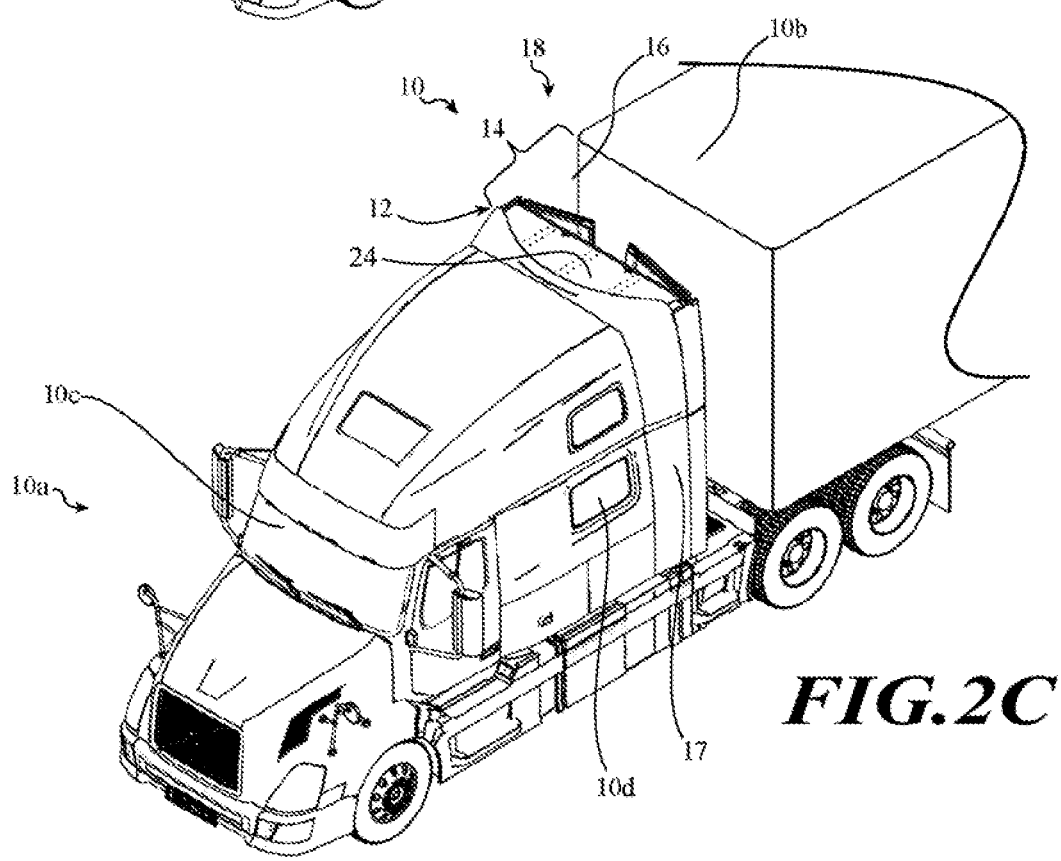
FIG. 2C is a front, left side, isometric view of the coupled vehicle and deployable faring of FIG. 2A, the deployable faring illustrated in the fully retracted configuration.
Figure 2D:
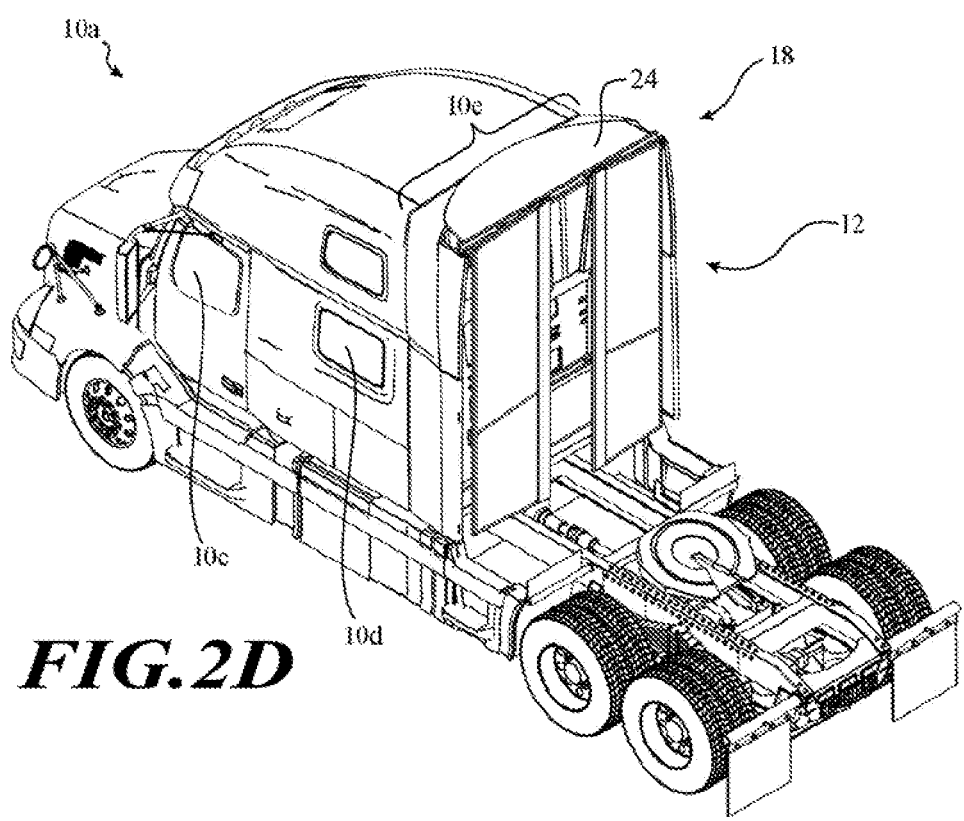
FIG. 2D is a rear, left side, isometric view of the tractor and deployable faring of FIG. 2A, the deployable faring illustrated in the fully retracted configuration.
Figure 2E:
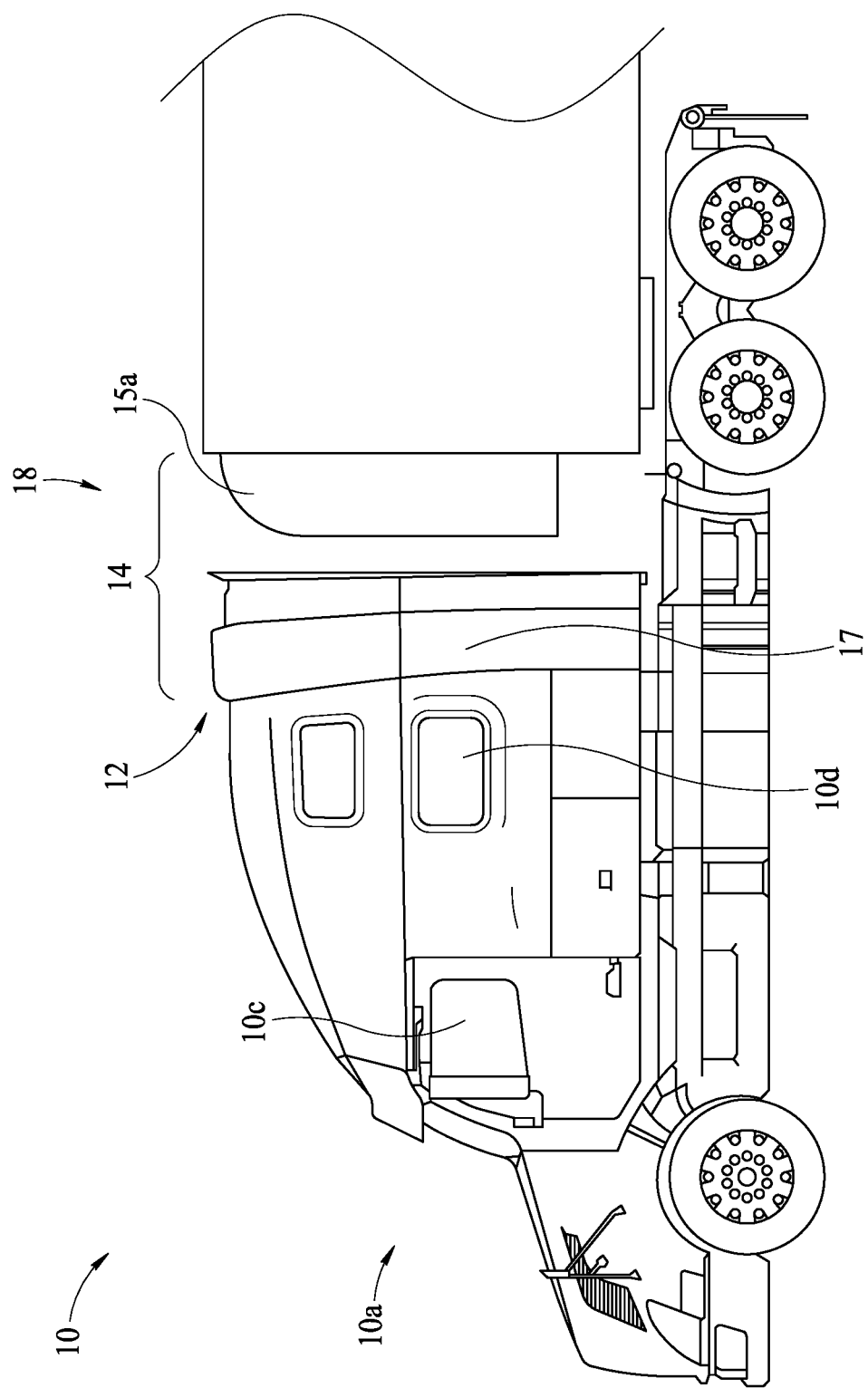
FIG. 2E is a left side elevational view of a coupled vehicle comprising a tractor and a trailer having a reefer cooling unit extending from a front thereof, and which employs deployable faring to partially close a gap between the tractor and the trailer, according to one illustrated implementation, the deployable faring illustrated in a fully retracted configuration retracted against the tractor.

FIG. 2E shows a vehicle 10 in the form of a coupled vehicle comprising a tractor 10a and a trailer 10b, the trailer 10b having a reefer cooling unit 15a extending from a front thereof, and which employs deployable faring system 12 with a deployable fairing 16 to partially close a gap between the tractor and the trailer, according to one illustrated implementation, the deployable faring 16 illustrated in a fully retracted configuration retracted against the tractor 10a.

Figure 2F:
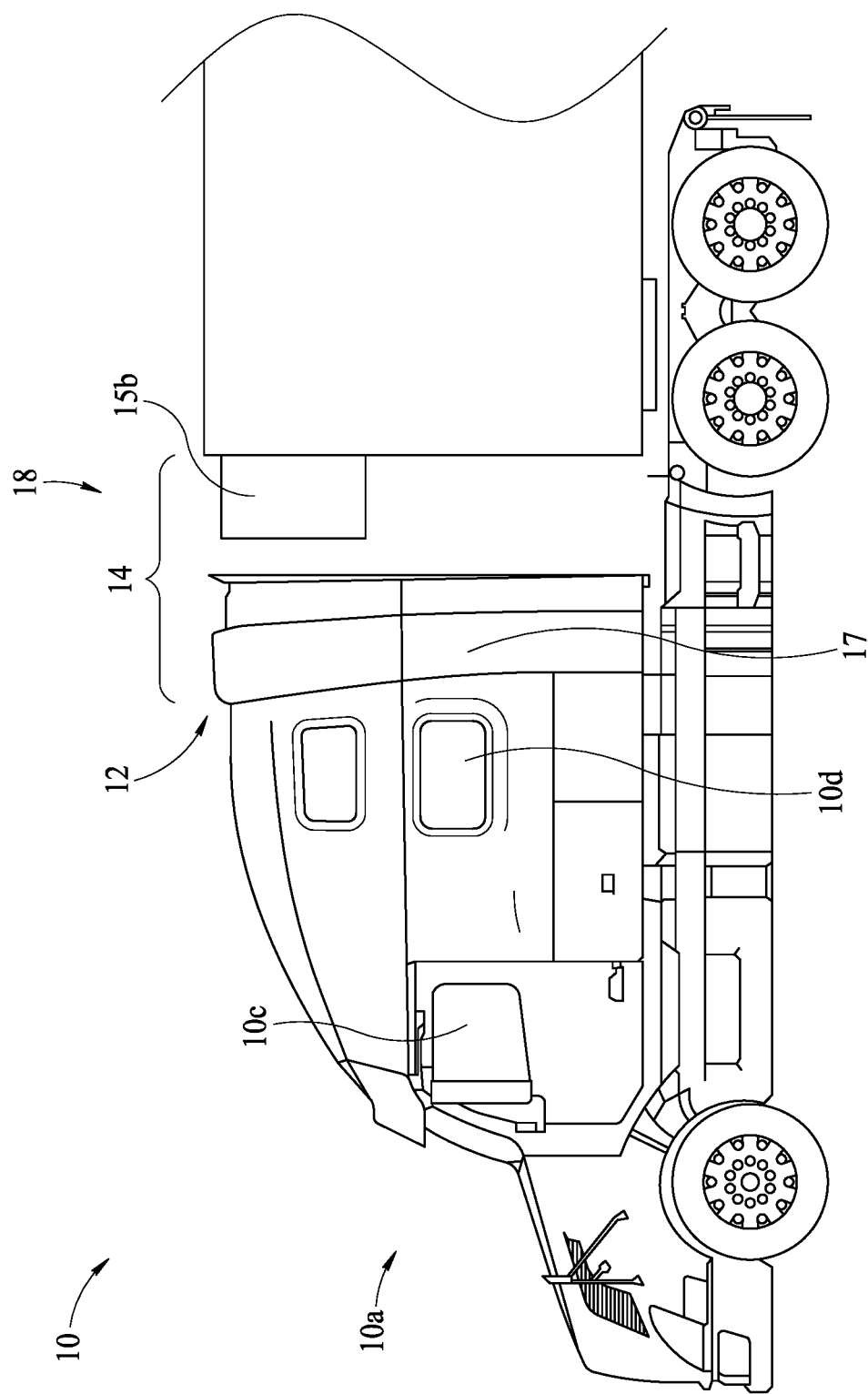
FIG. 2F is a left side elevational view of a coupled vehicle comprising a tractor and a trailer having a heater unit extending from a front thereof, and which employs deployable faring to partially close a gap between the tractor and the trailer, according to one illustrated implementation, the deployable faring illustrated in a fully retracted configuration retracted against the tractor.

FIG. 2F shows a vehicle 10 in the form of a coupled vehicle comprising a tractor 10a and a trailer 10b, the trailer 10b having a heater unit 15b extending from a front thereof, and which employs deployable faring system 12 with a deployable fairing 16 to partially close a gap between the tractor and the trailer, according to one illustrated implementation, the deployable faring 16 illustrated in a fully retracted configuration retracted against the tractor 10a.

Figure 2G:
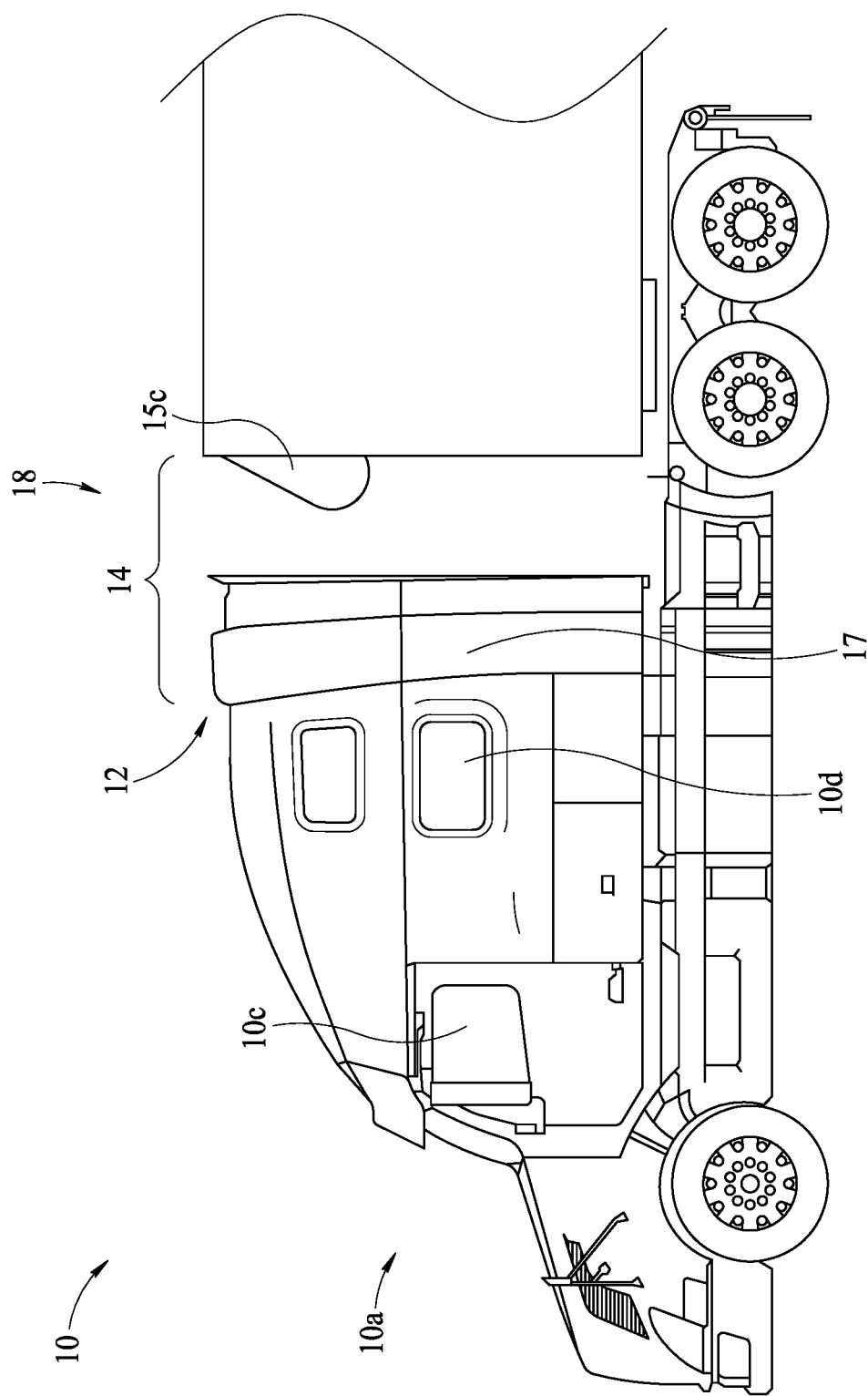
FIG. 2G is a left side elevational view of a coupled vehicle comprising a tractor and a trailer having a nose cone extending from a front thereof, and which employs deployable faring to partially close a gap between the tractor and the trailer, according to one illustrated implementation, the deployable faring illustrated in a fully retracted configuration retracted against the tractor.

FIG. 2G shows a vehicle 10 in the form of a coupled vehicle comprising a tractor 10a and a trailer 10b, the trailer 10b having a nose cone 15c extending from a front thereof, and which employs deployable faring system 12 with a deployable fairing 16 to partially close a gap between the tractor and the trailer, according to one illustrated implementation, the deployable faring 16 illustrated in a fully retracted configuration retracted against the tractor 10a.

Figure 3A:
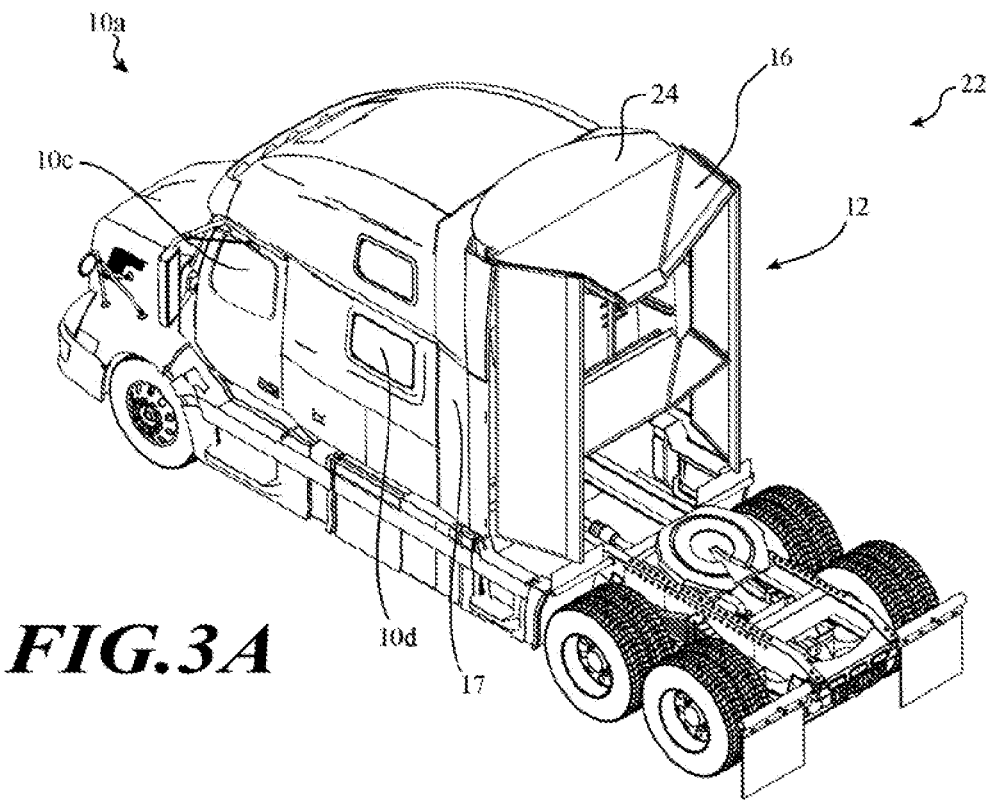
FIG. 3A is a rear, left side, isometric view of the tractor and deployable faring of FIGS. 1D and 2D, with the deployable faring illustrated in an intermediate configuration, between the deployed and the retracted configurations.
Figure 3B:
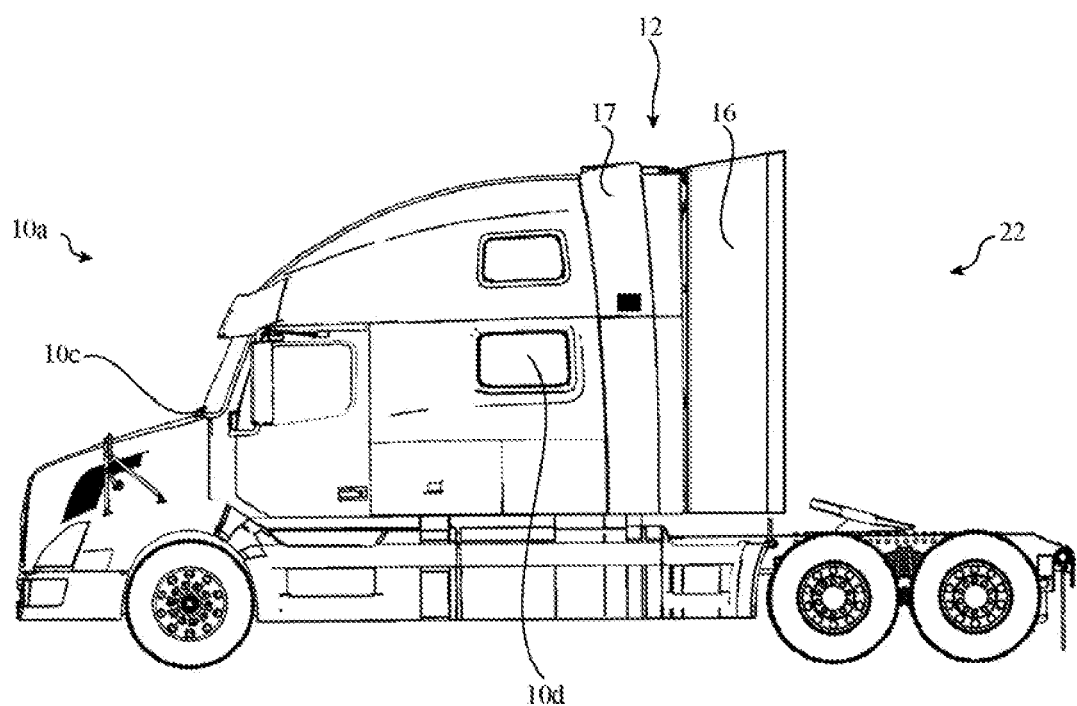
FIG. 3B is a left side elevational view of the tractor and deployable fairing of FIGS. 1D and 2D, with the deployable faring illustrated in an intermediate configuration, between the fully deployed and the fully retracted configurations.

FIGS. 3A and 3B show the tractor 10a, the static cab faring 17 and the deployable fairing 16 in a partially deployed or intermediate configuration 22. The deployable fairing 16 can, for example, take on the partially deployed or intermediate configuration 22 while moving or transiting between the fully deployed or fully extended configuration and the fully retracted or fully un-deployed configuration. Alternatively or additionally, the deployable fairing 16 can, for example, take on the partially deployed or intermediate configuration 22 when there is no trailer 10b coupled to the tractor 10a, when there is an object or obstacle in the gap region 14 which might cause damage to the deployable fairing 16 or portion thereof, and/or when environmental conditions (e.g., wind speed and/or wind direction, temperature of the ambient environment) meet certain criteria or thresholds. Thus, in at least some instances the deployable fairing 16 can be moved from, for example, the fully retracted or fully un-deployed configuration 18 to the partially deployed or intermediate configuration 22 and held in the partially deployed or intermediate configuration 22, without moving to the fully deployed or fully extended configuration 20. Such may advantageously increase fuel efficiency even when the vehicle 10 is not a coupled vehicle or train of vehicles. Additionally or alternatively, in at least some instances the deployable fairing 16 can be moved from, for example, the fully extended or fully deployed configuration 20 to the partially deployed or intermediate configuration 22 and held in the partially deployed or intermediate configuration 22, without moving to the fully retracted or fully un-deployed configuration 18.

Figure 4:
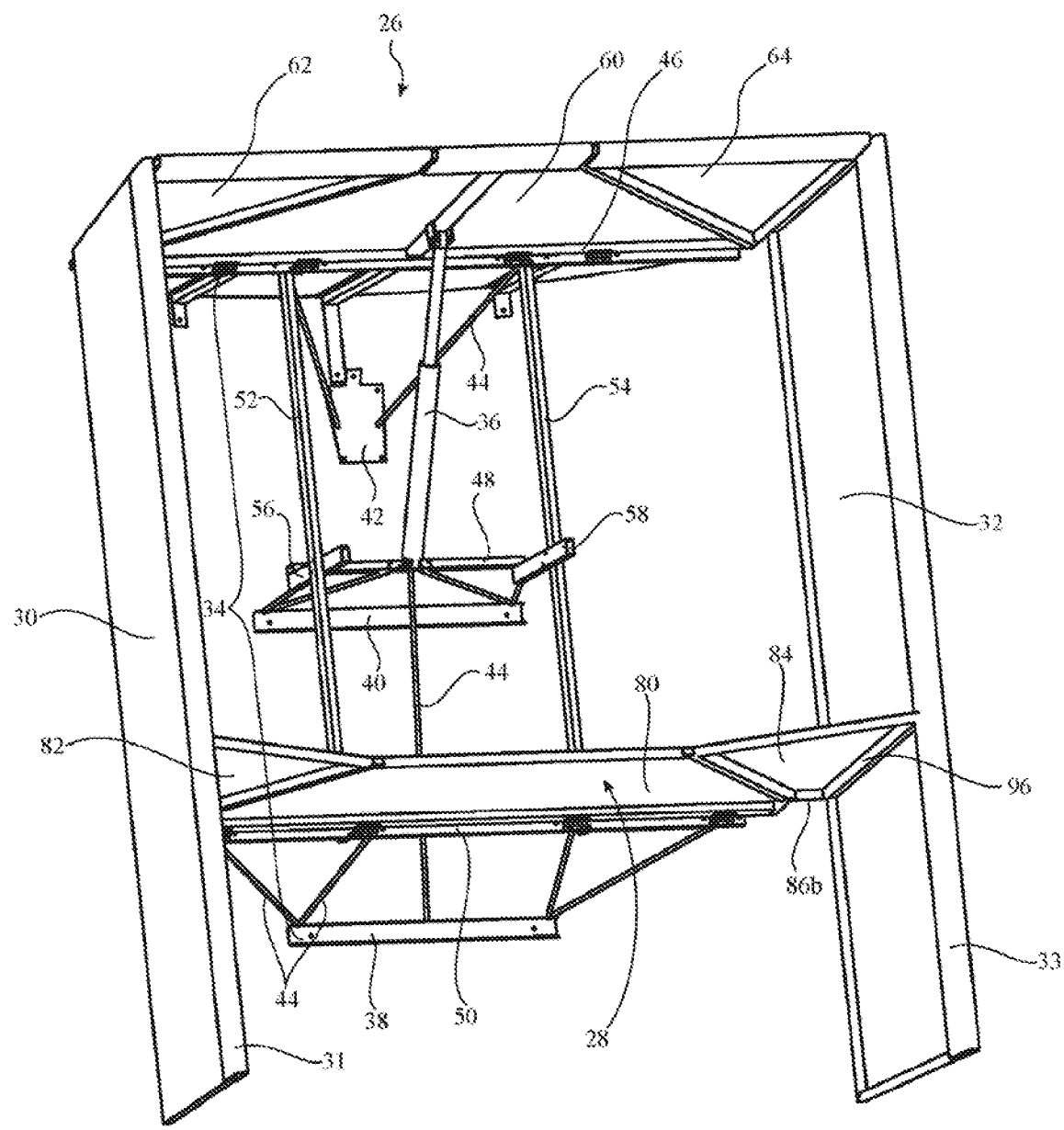
FIG. 4 is a bottom, rear, left side elevational view of a deployable fairing of FIGS. 1A-3B, which better illustrates a frame and an actuator selectively operable to move the deployable fairing between the fully retracted and fully deployed configurations.

FIG. 4 shows a deployable fairing system 12 with a deployable fairing 16 shown in an extended or deployed configuration 20, according to one illustrated implementation. In some implementations, the deployable fairing system 12 includes a static D-gap panel 24 (FIGS. 1A-D, 2A-2D, 3A), upper and lower horizontal panel assemblies 26 and 28, respectively, left and right side panels 30 and 32, respectively, a frame 34, and an actuator 36. The static D-gap panel 24 is attached to the back of the cab 10c, 10d and extends horizontally rearward towards the trailer 10b. The static D-gap panel 24 may be used to accommodate various shapes and configurations for the back of the cab 10c, 10d, thus enabling the deployable fairing system 12 to be installed, for example, as a retrofit on existing tractors 10a without creating a gap between the deployable fairing system 12 and the back of the cab 10c, 10d. In some implementations, the deployable fairing system 12 may not include the static D-gap panel 24.

In some implementations, the frame 34 attaches to the cab 10c, 10d at a lower attachment 38, a middle attachment 40, and an upper attachment 42. The lower, middle, and upper attachments 38, 40, and 42 are each physically coupled to the cab 10c, 10d using one or more bolts or other fasteners (e.g., rivets, screws, clamps). In many instances, there may be a limited number of locations on a cab 10c, 10d which are strong enough to provide a secure attachment location. Each of the lower, middle, and upper attachments 38, 40, and 42, respectively, includes one or more rods 44 that project outwardly from the respective attachments 38, 40, and 42 to provide support for the remaining portion of the deployable fairing system 12. In some implementations, a proximal end of each rod 44 may be affixed or otherwise physically coupled to one of the lower, middle, or upper attachment 38, 40, or 42, respectively, and project upwardly and rearwardly from the respective lower, middle, or upper attachment 38, 40, or 42, to which it is affixed. The distal end of each rod 44 may be attached to one of an upper bar 46, a middle bar 48, or a lower bar 50.

Each of the upper bar 46, the middle bar 48, and the lower bar 50 extends in a lateral direction across the width 10e of the cab 10a, horizontal with respect to the ground and perpendicular with respect to the direction of forward travel during normal operation of the vehicle 10. The upper bar 46 is attached to the distal, substantially straight edge 27 of the static D-gap panel 24. One or more hinges positioned along the upper bar 46 form an upper lateral axis 47 and pivotally couple the upper horizontal panel assembly 26 to the upper bar 46, enabling the upper horizontal panel assembly 26 to rotate about the upper lateral axis 47, as described below. The lower bar 50 may be directly below the upper bar 46 such that the lower bar 50 and the upper bar 46 form a vertical plane that is perpendicular with respect to the direction of forward travel during normal operation of the vehicle 10. In some implementations, a left and a right vertical support 52 and 54, respectively, are affixed or otherwise physically coupled to the upper bar 46 and the lower bar 50 to provide additional bracing and support for the frame 34. The lower bar 50 may be located about one-third of the way up from the bottom of one or both of the left and the right side panels 30 and 32, respectively. One or more hinges positioned along the lower bar 50 form a lower lateral axis 51 and physically couple the lower horizontal panel assembly 28 to the lower bar 50, enabling the lower horizontal panel assembly 28 to rotate about the lower lateral axis 51, as described below.

The middle bar 48 may be located in a vertical position about half way between the upper bar 46 and the lower bar 50. In some implementations, the middle bar 48 is located in a horizontal position between the back of the cab 10c, 10d and the vertical plane formed by the upper bar 46 and the lower bar 50. One or more horizontal supports (e.g., left horizontal support 56 and right horizontal support 58) may project rearwardly from the middle bar 48 and attach to the left vertical support 52 and the right vertical support 54 to provide additional bracing and support for the frame 34. The proximal end of the actuator 36 is pivotally coupled to the middle bar 48 with one or more hinges that enable the actuator 36 to pivot about a horizontal, lateral axis that extends through the hinges that couple the actuator 36 to the middle bar 48. The actuator 36 rotates about this horizontal, lateral axis as the deployable fairing 16 moves between the unextended configuration or position 18 and the extended position 20. The distal end of the actuator 36 is located upward and rearward from the proximal end of the actuator 36, and is attached to the upper horizontal panel assembly 26 with one or more hinges. These hinges enable the actuator 36 and the upper horizontal panel assembly 26 to rotate relative to each other as the actuator 36 moves the deployable fairing 16 between the fully unextended position or configuration 18 and the fully extended position or configuration 20.

The upper horizontal panel assembly 26 includes a deployable upper panel 60, a left upper wing panel 62, and a right upper wing panel 64. The deployable upper panel 60 is shaped like a trapezoid, with two bases, or parallel sides, (longer base 66 and shorter base 68) that extend in a lateral direction across the width 10e of the cab 10c. In some implementations, the deployable upper panel 60 may be shaped like a trapezoid but with one or more corners along the longer base cut off to form two additional short sides. Further in some implementations, the deployable upper panel 60 may be elongated at the shorter base 68, such as shown in FIG. 4A, thus forming two short sides (e.g., left short side 68a and right short side 68b) perpendicular to short base 68. In some implementations, the longer base 66 of the deployable upper panel 60 is located proximate the static D-gap panel 24 and forms a major edge that is pivotally coupled to the upper bar 46 or the substantially straight edge 27 of the static D-gap panel 24 using one or more hinges. The hinges enable the deployable upper panel 60 to rotate about the upper lateral axis 47 that extends in a lateral direction across the width 10e of the cab 10c, parallel to the longer base 66 and perpendicular to the direction of travel during normal operation, as discussed below. The two legs (left leg and right leg) of the deployable upper panel 60 form axes (left axis and right axis) that have non-zero acute angles with respect to the longer base and the upper lateral axis of the deployable upper panel 60. The left upper wing panel 62 is pivotally coupled to the deployable upper panel 60 using one or more hinges that form the left axis along the left leg, and the right upper wing panel 64 is pivotally coupled to the deployable upper panel 60 using one or more hinges that form the right axis along the right leg.

The left upper wing panel 62 has a trapezoidal profile with two parallel base edges (longer base edge and shorter base). The longer base edge forms the outside left edge of the upper horizontal panel assembly 26 when the deployable fairing 16 is in the fully extended position 20. The longer base edge is pivotally coupled to the left side panel 30 using one or more hinges that enable the left upper wing panel 62 to pivot relative to a left horizontal axis formed by the top edge of the left side panel 30. The hinges that pivotally couple the left upper wing panel 62 to the deployable upper panel 60 along the left axis enable the left upper wing panel 62 and the deployable upper panel 60 to pivot relative to one another as the deployable fairing 16 moves between the fully retracted position or configuration 18 and fully extended position 20. In some implementations, the left upper wing panel 62 is triangular in shape with a first edge adjacent, and pivotally coupled, to the deployable upper panel 60, and a second edge adjacent, and pivotally coupled, to the left side panel 30.

The right upper wing panel 64 is located opposite the left upper wing panel 62 from a centerline formed in the middle of the deployable upper panel 60. The right upper wing panel 64 has a trapezoidal profile with a longer base edge and a shorter base. The longer base edge forms the outside right edge of the upper horizontal panel assembly 26 when the deployable fairing 16 is in the extended position 20. The longer base edge is pivotally coupled to the right side panel 32 using one or more hinges that enable the right upper wing panel 64 to pivot relative to a right horizontal axis formed by the top edge of the right side panel 32. The hinges that pivotally couple the right upper wing panel 64 to the deployable upper panel 60 along right axis enable the right upper wing panel 64 and the deployable upper panel 60 to pivot relative to one another as the deployable fairing 16 moves between the fully retracted position or configuration 18 and the fully extended position or configuration 20. In some implementations, the right upper wing panel 64 is triangular in shape with a first edge that is adjacent, and pivotally coupled, to the deployable upper panel 60 along the right leg, and a second edge that is adjacent, and pivotally coupled, to the right side panel 32.

The lower horizontal panel assembly 28 includes a deployable lower panel 80, a left lower wing panel 82, and a right lower wing panel 84. The deployable lower panel 80 may have two parallel, lateral sides (longer base 86b and shorter base) that extend in a lateral direction across the width 10e of the cab 10c, 10d. In some implementations, the longer base of the deployable lower panel 80 is located proximate the cab 10c, 10d and forms a major edge that is pivotally coupled to the lower bar 50 or a part of the cab 10c, 10d. The hinges enable the deployable lower panel 80 to rotate about the lower lateral axis that extends in a lateral direction across the width 10e of the back of the cab 10c, 10d, parallel to the longer base 86 and perpendicular to the direction of travel during normal operation, as discussed below. In some implementations, the deployable lower panel 80 may be shaped like a trapezoid but with one or more corners along the longer base cut off to form two additional short sides perpendicular to the longer base, as shown in FIG. 4. Further in some implementations, the deployable lower panel 80 may be elongated at the shorter base thus forming two short sides perpendicular to shorter base.

The deployable lower panel 80 may have two diagonal legs (left leg and right leg) that form diagonal axes (left axis and right axis) having non-zero acute angles with respect to the lower lateral axis and the longer base of the deployable lower panel 80. The deployable lower panel 80 is pivotally coupled to the left lower wing panel 82 along the left axis using one or more hinges along the left leg, and the deployable lower panel 80 is pivotally coupled to the right lower wing panel 84 along the right axis using one or more hinges along the right leg. The lower horizontal panel assembly 28 may further optionally be physically coupled to the upper horizontal panel assembly 26 using one or more cables, rods, or other links (not shown).

The left lower wing panel 82 has four sides, including a left side edge and a shorter base. The longer base edge forms the outside left edge of the lower horizontal panel assembly 28 when the deployable fairing 16 is in the fully extended position 20. The left side edge 92 is pivotally coupled to the left side panel 30 using one or more hinges that enable the left lower wing panel 82 to pivot relative to a lower left horizontal axis that extends through the left side panel 30. The hinges that pivotally couple the left lower wing panel 82 to the deployable lower panel 80 enable the left lower wing panel 82 to pivot relative to the deployable lower panel 80 as the deployable fairing 16 moves between the fully retracted position or configuration 18 and the fully extended position or configuration 20. In some implementations, the left lower wing panel 82 is triangular in shape with a first edge that is adjacent, and pivotally coupled, to the deployable lower panel 80 along the left leg, and a second edge that is adjacent, and pivotally coupled, to the left side panel 30.

The right lower wing panel 84 is located opposite the left lower wing panel 82 from a centerline formed in the middle of the deployable lower panel 80. The right lower wing panel 84 has four sides, including a right side edge 96. The right side edge 96 forms the outside right edge of the lower horizontal panel assembly 28 when the deployable fairing 16 is in the extended position 20. The longer base edge 96 is pivotally coupled to the right side panel 32 using one or more hinges that enable the right lower wing panel 84 to pivot relative to a lower right horizontal axis that extends across the right side panel 32. The hinges that pivotally couple the right lower wing panel 84 to the deployable lower panel 80 enable the right lower wing panel 84 and the deployable lower panel 80 to pivot relative to one another as the deployable fairing 16 moves between the fully retracted position or configuration 18 and the fully extended position or configuration 20. In some implementations, the right lower wing panel 84 is triangular in shape with a first edge that is adjacent, and pivotally coupled, to the deployable lower panel 80 along the right leg, and a second edge that is adjacent, and pivotally coupled, to the left side panel 30.

The left and the right side panels 30 and 32, respectively, are each pivotally coupled to one or both of the upper and lower horizontal panel assemblies 26 and 28. The left side panel 30 and the right side panel 32 pivot about vertical axes (left vertical axis and right vertical axis) that extend along or beside a proximal edge of the left side panel 30 and a proximal edge of the right side panel 32, both relative to the cab 10c. In some implementations, neither the proximal edge of the left side panel 30 nor the proximal edge of the right side panel 32 includes any hinges. In some such implementations, the left and the right side panels 30 and 32, respectively, are physically coupled to the other components of the fairing system 12 only through the pivotal couplings with the upper wing panels 62 and 64 of the upper horizontal panel assembly 26, and the lower wing panels 82 and 84 of the lower horizontal panel assembly 28. In some implementations, the left and the right side panels 30 and 32, respectively, are physically coupled to the fairing system 12 only through the pivotal couplings with upper left wing panel 62 and the right upper wing panel 64 of the upper horizontal panel assembly 26. Further, in such implementations, the fairing system 12 may not have any vertical hinges between the deployable fairing 16 and the tractor 10a or the cab 10c, 10d.

The left and the right side panels 30 and 32, respectively, each extend vertically with respect to the cab 10c, 10d when the deployable fairing 16 is both in the unextended or fully retracted or fully un-deployed position or configuration 18 and in the fully extended or fully deployed position or configuration 20. When the deployable fairing 16 is in the fully extended or fully deployed position 20, the left and the right side panels 30 and 32 may be substantially parallel to the direction of travel during normal operation and substantially perpendicular to the upper horizontal panel assembly 26, extending rearwardly from the cab 10c. In some implementations, the left and the right side panels 30 and 32 may alternatively be at a positive slope, slightly flaring out from vertical planes that extend rearwardly from the side of the cab 10c, when the fairing system 12 is in the fully extended or fully deployed position 20. When the deployable fairing 16 is in the unextended or fully retracted or fully un-deployed position or configuration 18, the left and the right side panels 30 and 32 pivot inward toward the back of the cab 10c to form a negative slope with respect to a vertical plane that extends parallel to a direction of travel during normal operation. In some implementations in which the deployable fairing 16 is in the unextended or fully retracted or fully un-deployed position or configuration 18, the left and the right side panels 30 and 32 may pivot into positions in which the left and the right side panels 30 and 32 each extend laterally along the width 10e of the cab 10c, to be substantially perpendicular to the direction of travel during normal operation. When the deployable fairing 16 is in the intermediary position 22, the left and the right side panels 30 and 32 may be substantially vertical with respect to the ground; in addition the left and the right side panels 30 and 32 may be rotated inward towards the back of the cab 10c by a certain angle (e.g., rotated inward by about 45° from their respective locations in the extended position 20).

The actuator 36 is illustrated as piston and a cylinder. The cylinder may have an interior or chamber. The piston includes a piston head (not visible) and piston arm coupled to the piston head. The piston head is translatable received within the chamber of the cylinder, typically with a fairly tight tolerance. The piston head divides the chamber into two portions, the volume of each portion varying inversely proportional to one another as the piston head translates back and forth with the chamber. One or more valves are selectively operable to control a pressure in each portion of the chamber of the cylinder. Pressure may come from a pressure source or reservoir via one or more fluidly communicative paths, e.g., lines or hoses. The piston and reservoir may be pneumatic or hydraulic, and one or more compressors may maintain a pressure in the reservoir. The compressor and/or reservoir may be a dedicated part of the deployable fairing system, or may be part of the vehicle. Alternatively, the actuator 36 may take the form of one or more solenoids or electric motors (e.g., stepper motor) along with a suitable transmission (e.g., linkage). Where the deployable fairing 16 may assume an number of intermediate positions between the fully deployed configuration 20 and the fully retracted or fully un-deployed configuration 18, it may be particularly advantageous to employ a solenoid or electric motor as the actuator(s), for example via a transmission, as opposed to pneumatic or hydraulic actuators.

In some implementations, the left and right side panels 30 and 32 may include one or more elastic or conformable portions that enable portions of the left and the right side panels 30 and 32 to bend or to alter their shape. For example, a left trailing edge 31 of the left side panel and a right trailing edge 33 of the right side panel 32 may be comprised of an elastic or resilient, deformable or conformable material that enables the trailing edges 31 and 33 to alter their shapes. Such elastic, deformable material may extend the entire length of the left and the right trailing edges 31 and 33. As a result, in such implementations, the left and the right side panels 30 and 32 of the deployable fairing 16 may extend across the entire gap region 14 such that left and the right side panels 30 and 32 apply rearward forces to the trailing edges 31 and 33, thereby engaging the trailing edges 31 and 33 with corresponding, opposing edges of the trailer 10b. Because the left and the right trailing edges 31 and 33 are deformable or conformable, the shapes of each of the trailing edges 31 and 33 may be altered to become complementary to the shapes of the opposing edges of the trailer 10b when the trailing edges 31 and 33 are engaged with and pressed into the respective opposing edges of the trailer 10b. The elasticity of the trailing edges 31 and 33 further enables the vehicle 10 to make minor turns, such as those that might be encountered in changing lanes on a highway, by providing some flexibility and give between the left and the right side panels 31 and 33 and the trailer 10b. Some or all of a trailing edge 29 of the deployable upper horizontal panel assembly may also be comprised of a deformable, elastic substance to engage with the leading top edge of the trailer 10b.

Figure 5:
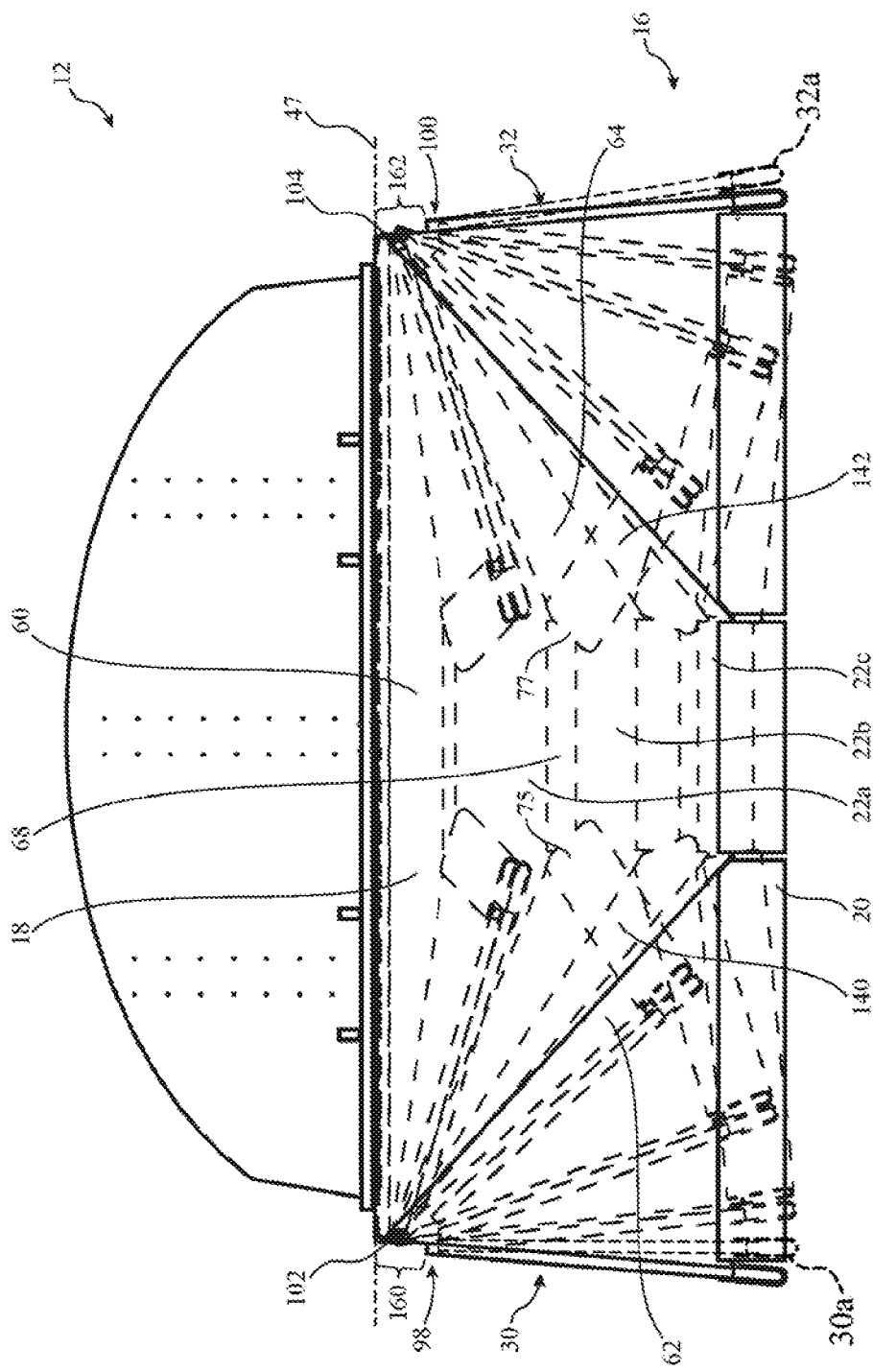
FIG. 5 is a top plan view of a deployable fairing showing the right and left side panels with a bent edge moving through a variety of configurations, from the fully deployed configuration to the fully retracted or un-deployed configuration and therebetween, and better illustrating a plurality of intermediate configurations between the fully deployed configuration and the fully retracted or un-deployed configuration.

FIG. 5 is a top plan view of the deployable fairing system 12 showing the right and left side panels 30 and 32 with a bent edge moving through a variety of configurations, from the fully deployed configuration 20 to the fully retracted or fully un-deployed configuration 18 and a plurality of intermediate configurations therebetween, and better illustrating a rotation of the left and the right side panels 30 and 32 about vertical axes 102 and 104 (out of drawing sheet) and rotation of the deployable upper panel 60 about the upper lateral axis 47 (planar with drawing sheet).

As the deployable fairing 16 transitions from the fully unextended or fully retracted or fully un-deployed configuration 18, the deployable upper panel 60 rotates about the upper lateral axis 47 such that the short base 68 of the deployable upper panel 60 rotates successively upward and rearward in each of the intermediary stages 22a, 22b, and 22c shown in FIG. 9 until the deployable upper panel 60 is in a substantially horizontal position when the deployable fairing 16 is in the fully extended or fully deployed configuration 20, assuming that the deployable fairing 16 is no constrained to one of the intermediate configurations. The upward and rearward transition of the short base 68 of the deployable upper panel results in the short bases 75 and 77 of the left and the right upper wing panels 62 and 64, respectively, likewise rotating rearward and upward. This rotation, in turn, causes the trailing edges of the left and the right upper wing panels 62 and 64 to rotate rearward towards the trailer 10b through the intermediary configurations 22a, 22b, and 22c until the left and the right upper wing panels 62 and 64 are in a substantially horizontal position when the deployable fairing 16 is in the fully extended configuration 20.

The rotation of the trailing edges 140 and 142 of the left and the right upper wing panels 62 and 64 results in the rotation of the left and the right side panels 30 and 32 about the vertical axes 102 and 104, respectively. This rotation continues until the left and the right side panels 30 and 32 extend rearwardly from the back of the cab 10c towards the trailer 10b when the deployable fairing 16 is in the fully extended configuration 20. In some implementations, the proximal edges 98 and 100 of the left and the right side panels 30 and 32, respectively, are separated by distances 160 and 162 from the vertical axes 102 and 104.

As further illustrated in FIG. 5, it is possible to deploy the left and the right side panels 30 and 32 about the vertical axes 102 and 104, respectively, to obtain a desired angle of attach with respect to a direction of travel. For instance, some implementations have sufficient flexibility that the one of the left or the right side panels 30 and 32 can be hyper-extended as illustrated by broken line representation of right side panel 32a, which has a larger angle of attack as measured along a longitudinal axis than the solid line representation of the right side panel 32. At the same time, the left side panel as illustrated by broken line representation of right side panel 30a has a smaller angle of attack as measured along the longitudinal axis than the solid line representation of the left side panel 30. Thus, the overall structure may not be symmetrical when viewed in the top plan view. The ability to change the angle of attack of the left and right panels 30, 32 is particularly advantageous. For example, the angle of attack may be changed in response to a crosswind (e.g., speed and/or direction) and/or precipitation (e.g., amount and/or direction), thereby reducing the amount of wind and/or precipitation striking a front of the trailer and significantly increasing fuel economy and reducing engine wear. While described as associated with flexibility, in some implementations the deployable fairings may be hinged to facilitate the varied angle of attack without there being any flexibility in the system and without hyper-extension of the side panels.

Figure 6A:
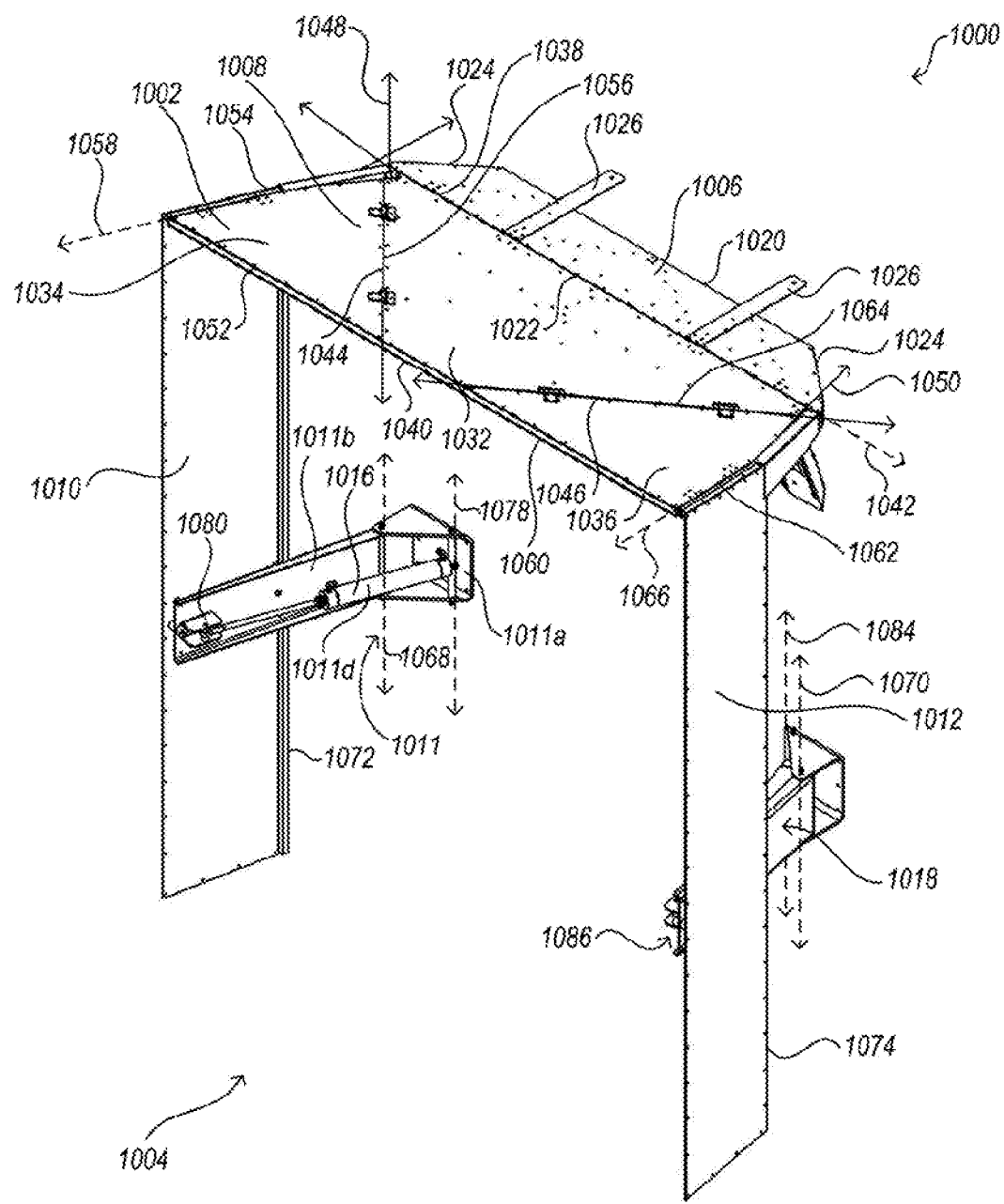
FIG. 6A is a top, rear, right-side isometric view of a deployable fairing in which the deployable fairing is shown in a deployed configuration, according to at least another illustrated implementation.
Figure 6B:
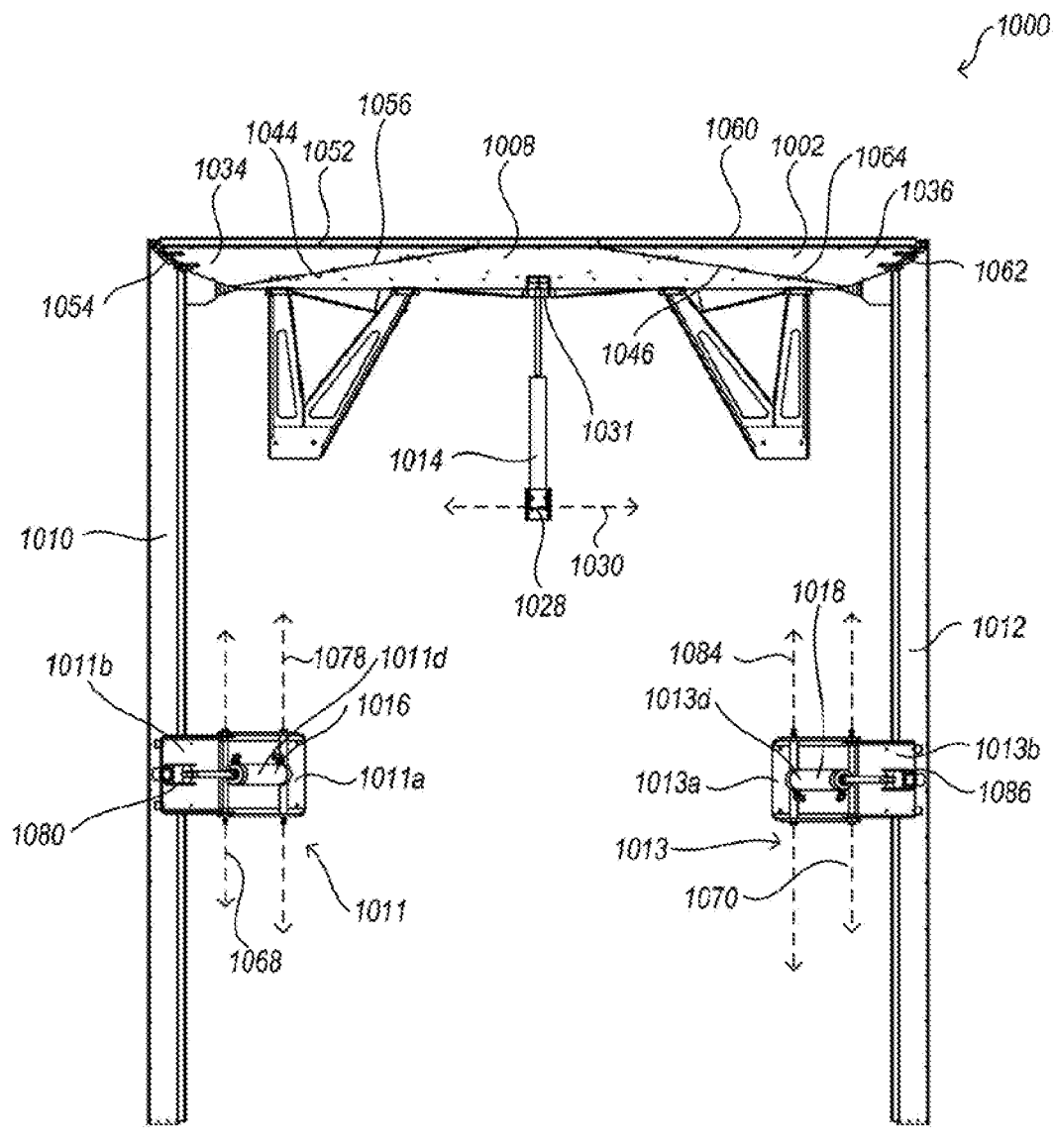
FIG. 6B is a rear elevational view of the deployable fairing of FIG. 6A in which the deployable fairing is shown in the deployed configuration, according to at least one illustrated implementation.

FIGS. 6A and 6B, and show another type of deployable fairing system 1000 with a deployable fairing 1002 shown in an extended or deployed configuration 1004, according to one illustrated implementation. In some implementations, the deployable fairing system 1000 includes a static D-gap panel 1006, upper horizontal panel assemblies 1008, left and right side panels 1010 and 1012, respectively, and a center actuator 1014, a left actuator 1016, and a right actuator 1018. In some implementations, the deployable fairing system 1000 may only include the center actuator 1014. In some implementations, the deployable fairing system 1000 may only include the left actuator 1016 and the right actuator 1018. In some implementations, one or more of the center actuator 1014, the left actuator 1016, and/or the right actuator 1018 may be a respective piston and cylinder pair. In some implementations, one or more of the center actuator 1014, the left actuator 1016, and/or the right actuator 1018 may be an electric motor or a solenoid.

The static D-gap panel 1006 is attached to the back of the cab 10c, 10d and extends horizontally rearward towards the trailer 10b. The static D-gap panel 1006 may be physically coupled to the back of the cab 10c, 10d via one or more elongated straps 1026 that extend rearward from the cab 10c, 10d towards the trailer 10b. The static D-gap panel 1006 has a D-shaped profile, with a minor edge 1020 proximate the back of the cab 10c, 10d. The minor edge 1020 may be substantially straight in some implementations. The static D-gap panel 1006 may have a major edge 1022 opposing the minor edge 1020 that is distal to the cab 10c, 10d. In some implementations, the length of the major edge 1022 may be greater than the length of the minor edge 1020. One or more side edges 1024 may extend between the minor edge 1020 and the major edge 1022. Such one or more side edges 1024 may meet one or both of the minor edge 1020 and the major edge 1022 at a non-perpendicular angle. The static D-gap panel 1006 may be used to accommodate various shapes and configurations for the back of the cab 10c, 10d, thus enabling the deployable fairing system 1000 to be installed, for example, as a retrofit on existing tractors 10a without creating a gap between the deployable fairing system 1000 and the back of the cab 10c, 10d. In some implementations, the deployable fairing system 1000 may not include the static D-gap panel 1006.

The proximal end of the center actuator 1014 is pivotally coupled to the back of the cab 10c, 10d with one or more center hinges 1028 that enable the center actuator 1014 to pivot about a horizontal, lateral axis 1030 that extends through the center hinges 1028 that couple the center actuator 1014 to the back of the cab 10c, 10d. The center actuator 1014 rotates about the horizontal, lateral axis 1030 as the deployable fairing 1002 moves between the retracted configuration 1100 and the deployed configuration 1004. When the deployable fairing 1002 is in the deployed configuration 1004, the distal end of the center actuator 1014 is located upward and rearward from the proximal end of the center actuator 1014, and is attached to the upper horizontal panel assembly 1008 with one or more upper hinges 1031. The upper hinges 1031 enable the center actuator 1014 and the upper horizontal panel assembly 1008 to rotate relative to each other as the center actuator 1014 moves the deployable fairing 1002 between the retracted configuration 1100 and the deployed configuration 1004.

The upper horizontal panel assembly 1008 may include a deployable upper panel 1032, a left upper wing panel 1034, and a right upper wing panel 1036. The deployable upper panel 1032 may be shaped like a trapezoid, with two bases, or parallel sides, (leading edge 1038 and trailing edge 1040) that extend in a lateral direction across the width 10e of the cab 10c. In some implementations, the deployable upper panel 1032 may be shaped like a trapezoid but with one or more corners along the longer base cut off to form two additional short sides. In some implementations, the leading edge 1038 of the deployable upper panel 1032 is located proximate the static D-gap panel 1006 and forms a major edge that is pivotally coupled to the major edge 1022 of the static D-gap panel 1006 using one or more hinges. The hinges enable the deployable upper panel 1032 to rotate about an upper horizontal axis 1042 that extends in a lateral direction across the width 10e of the cab 10c, parallel to the major edge 1022 and perpendicular to the direction of travel during normal operation, as discussed below. When the deployable fairing 1002 is in the deployed configuration 1004, the deployable upper panel 1032 may extend rearwardly from the upper horizontal axis 1042 and be titled relatively upward from the upper horizontal axis 1042 in which the trailing edge 1040 of the deployable upper panel 1032 is positioned relatively above the leading edge 1038 of the deployable upper panel 1032. The two legs (left leg 1044 and right leg 1046) of the deployable upper panel 1032 form axes (left axis 1048 and right axis 1050) that have non-zero acute angles with respect to the major edge 1022 and the upper horizontal axis 1042 of the deployable upper panel 1032. The left upper wing panel 1034 is pivotally coupled to the deployable upper panel 1032 using one or more hinges that form the left axis 1048 along the left leg 1044, and the right upper wing panel 1036 is pivotally coupled to the deployable upper panel 1032 using one or more hinges that form the right axis 1050 along the right leg 1046.

The left upper wing panel 1034 has a triangular profile with a distal edge 1052, an outside edge 1054, and an interior edge 1056. The outside edge 1054 forms the outside left edge of the upper horizontal panel assembly 1008 when the deployable fairing 1002 is in the deployed configuration 1004. The outside edge 1054 may be pivotally coupled to the left side panel 1010 using one or more hinges that enable the left upper wing panel 1034 to pivot relative to a left horizontal axis 1058 formed by the top edge of the left side panel 1010. The hinges that pivotally couple the left upper wing panel 1034 to the deployable upper panel 1032 along the left axis 1048 enable the left upper wing panel 1034 and the deployable upper panel 1032 to pivot relative to one another as the deployable fairing 1002 moves between the retracted configuration 1100 and the deployed configuration 1004.

The right upper wing panel 1036 is located opposite the left upper wing panel 1034 across the deployable upper panel 1032. The right upper wing panel 1036 has a triangular profile with a distal edge 1060, an outside edge 1062, and an interior edge 1064. The outside edge 1062 forms the outside right edge of the upper horizontal panel assembly 1008 when the deployable fairing 1002 is in the deployed configuration 1004. The outside edge 1062 may be pivotally coupled to the right side panel 1012 using one or more hinges that enable the right upper wing panel 1036 to pivot relative to a right horizontal axis 1066 formed by the top edge of the right side panel 1012. The hinges that pivotally couple the right upper wing panel 1036 to the deployable upper panel 1032 along right axis 1050 enable the right upper wing panel 1036 and the deployable upper panel 1032 to pivot relative to one another as the deployable fairing 1002 moves between the retracted configuration 1100 and the deployed configuration 1004.

The left and the right side panels 1010 and 1012, respectively, are each pivotally coupled to the upper horizontal panel assembly 1008 along the left axis 1048 and right axis 1050, respectively of the deployable upper panel 1032. In some implementations, the left side panel 1010 may be coupled to a left hinge 1011 that is comprised of a base 1011a and an arm 1011b. The base 1011a may be physically coupled to the back of the cab 10c. As such, in some implementations, the left hinge 1011 may be the only hinge that directly couples the left side panel 1010 to the cab 10c. In some implementations, the left side panel 1010 may rotatably couple to the cab 10c via multiple hinges. A proximal end of the arm 1011b of the left hinge 1011 may rotatably couple to the base 1011a and rotate about a left vertical hinge axis 1068. A distal end of the arm 1011b may be physically coupled to the left side panel 1010. In some implementations, for example, the left side panel 1010 may be spaced along the arm 1011b such that a proximal edge 1072 of the left side panel 1010 is located at least two inches from the base 1011a of the left hinge 1011. In some implementations, the left side panel 1010 may be spaced along the arm 1011b by a distance that is one-half inch more than a length of the static cab fairing 17 that extends rearwardly from the back of the cab 10c. As such, the left side panel 1010 may be translated away from the back of the cab 10c and pivot about the left vertical hinge axis 1068 when the deployable fairing 1002 transitions to the deployed configuration 1004 from the retracted configuration 1100. In some implementations, a set of resilient shock absorbers 1011d may be interposed between the left side panel 1010 and the left hinge 1011 to absorb impacts, such as, for example, may occur with bumpy road or with objects hitting the left side panel 1010.

The right side panel 1012 may be coupled to a right hinge 1013 that is comprised of a base 1013a and an arm 1013b. The base 1013a may be physically coupled to the back of the cab 10c. As such, in some implementations, the right hinge 1013 may be the only hinge that directly couples the right side panel 1012 to the cab 10c. In some implementations, the right side panel 1012 may rotatably couple to the cab 10c via multiple hinges. A proximal end of the arm 1013b of the right hinge 1013 may rotatably couple to the base 1013a and rotate about a right vertical hinge axis 1070. A distal end of the arm 1013b may be physically coupled to the right side panel 1012. In some implementations, for example, the right side panel 1012 may be spaced along the arm 1013b such that a proximal edge 1074 of the right side panel 1012 is located at least two inches from the base 1013a of the right hinge 1013. In some implementations, the right side panel 1012 may be spaced along the arm 1013b by a distance that is one-half inch more than a length of the static cab fairing 17 that extends rearwardly from the back of the cab 10c. As such, the right side panel 1012 may be translated away from the back of the cab 10c and pivot about the right vertical hinge axis 1070 when the deployable fairing 1002 transitions to the deployed configuration 1004 from the retracted configuration 1100. In some implementations, a set of resilient shock absorbers 1013d may be interposed between the right side panel 1012 and the right hinge 1013 to absorb impacts, such as, for example, may occur with bumpy road or with objects hitting the right side panel 1012.

In some implementations, such as, for example, implementations in which a plurality of hinges rotatably couple the deployable upper panel 1032, the left upper wing panel 1034, and the right upper wing panel 1036, the deployable fairing 1002 may be kinematically over-constrained, but for a combined flexibility of the left side panel 1010 and/or the right side panel 1012. In such implementations, the left side panel 1010 and/or the right side panel 1012 may be comprised of a respective skin and frame, as discussed below. Such skins may be comprised of glass reinforced plastic (e.g., polypropylene and glass fiber) that may be attached to the frame. The frame may be comprised of one or more tubes.

Such vertical axes (left vertical axis 1068 and right vertical axis 1070) may extend along or parallel to the proximal edge 1072 of the left side panel 1010 and the proximal edge 1074 of the right side panel 1012, both relative to the cab 10c. Such vertical axes (left vertical hinge axis 1068 and right vertical hinge axis 1070) may be perpendicular to the upper horizontal axis 1042 about which the deployable upper panel 1032 rotates. In some implementations, the proximal edge 1072 of the left side panel 1010 and the proximal edge 1074 of the right side panel 1012 may be located away from the left vertical hinge axis 1068 and the right vertical hinge axis 1070, respectively. In some implementations, neither the proximal edge 1072 of the left side panel 1010 nor the proximal edge 1074 of the right side panel 1012 includes any hinges. In some such implementations, the left and the right side panels 1010 and 1012, respectively, are physically coupled to the other components of the fairing system 1000 only through the pivotal couplings with the upper left wing panel 1034 and right upper wing panel 1036 of the upper horizontal panel assembly 1008. In some implementations, the left side panel 1010 and the right side panel 1012 may have no vertical hinges along the respective proximal edges 1072 and 1074.

In some implementations, the left side panel 1010 may be rotatably translated and pivoted by the left actuator 1016. The proximal end of the left actuator 1016 may be pivotally coupled to the base 1011a of the left hinge 1011 that is located proximate the back of the cab 10c, 10d. This rotatable coupling to the base 1011a of the left hinge 1011 may enable the left actuator 1016 to pivot about a left actuator vertical axis 1078 that extends vertically through the base 1011a of the left hinge 1011. A distal end of the left actuator 1016 may be coupled to the arm 1011b of the left hinge 1011 at a distance from the base 1011a. Thus, the left hinge 1011 and left actuator 1016 may advantageously form an integral unit, installable or replaceable as a single unit. The left actuator 1016 rotates about the left actuator vertical axis 1078 as the deployable fairing 1002 moves between the retracted configuration 1100 and the deployed configuration 1004, thereby applying an outward and rearward force on the left side panel 1010 to translate and pivot the left side panel 1010 away from the back of the cab 10c. When the deployable fairing 1002 is in the deployed configuration 1004, the distal end of the left actuator 1016 is located rearward and outward from the proximal end of the left actuator 1016, and is attached to the arm 1011b of the left hinge 1011 and/or to the left side panel 1010 with one or more left side panel hinges 1080. The left side panel hinges 1080 enable the left actuator 1016 to rotate relative to the arm 1011b of the left hinge 1011 and/or to the left side panel 1010 as the deployable fairing 1002 moves between the retracted configuration 1100 and the deployed configuration 1004. In some implementations, the left actuator vertical axis 1078 may be co-located with the left vertical hinge axis 1068. In some implementations, such as that shown in FIGS. 6A and 6B the left actuator vertical axis 1078 may be offset from the left vertical hinge axis 1068. In some implementations, the left actuator 1016 may be directly, rotatably, physically coupled to either or both of the back of the cab 10*c* and/or the left side panel 1010.

In some implementations, the right side panel 1012 may be rotatably translated and pivoted by the right actuator 1018. The proximal end of the right actuator 1018 is pivotally coupled to the base 1013*a* of the right hinge 1013 that is located proximate the back of the cab 10*c*, 10*d* that enables the right actuator 1018 to pivot about a right actuator vertical axis 1084 that extends through the right hinge 1013. A distal end of the right actuator 1018 may be coupled to the arm 1013*b* of the right hinge 1013 at a distance from the base 1013*a*. Thus, the right hinge 1013 and right actuator 1018 may advantageously form an integral unit, installable or replaceable as a single unit. The right actuator 1018 rotates about the right actuator vertical axis 1084 as the deployable fairing 1002 moves between the retracted configuration 1100 and the deployed configuration 1004, thereby applying an outward and rearward force on the right side panel 1012 to translate and pivot the right side panel 1012 away from the back of the cab 10*c*. When the deployable fairing 1002 is in the deployed configuration 1004, the distal end of the right actuator 1018 is located rearward and outward from the proximal end of the right actuator 1018, and is attached to the arm 1013*b* of the right hinge 1013 and/or to the right side panel 1012 with one or more right side panel hinges 1086. The right side panel hinges 1086 enable the right actuator 1018 and the right side panel 1012 to rotate relative to each other as the deployable fairing 1002 moves between the retracted configuration 1100 and the deployed configuration 1004. In some implementations, the right actuator vertical axis 1084 may be co-located with the right vertical hinge axis 1070. In some implementations, such as that shown in FIGS. 10A through 10E the right actuator vertical axis 1084 may be offset from the right vertical hinge axis 1070. In some implementations, the right actuator 1018 may be directly, rotatably, physically coupled to either or both of the back of the cab 10*c* and/or the right side panel 1012.

The left and the right side panels 1010 and 1012, respectively, each extend vertically with respect to the cab 10*c*, 10*d* when the deployable fairing 1002 is both in the unextended or retracted or un-deployed configuration 1100 and in the extended or deployed configuration 1004. When the deployable fairing 1002 is in the deployed configuration 1004, the left and the right side panels 1010 and 1012 may be substantially parallel to the direction of travel during normal operation and substantially perpendicular to the upper horizontal panel assembly 1008, extending rearwardly from the cab 10*c*. In some implementations, the left and the right side panels 1010 and 1012 may alternatively be at a positive slope, slightly flaring out from vertical planes that extend rearwardly from the side of the cab 10*c*, when the deployable fairing 1002 is in the deployed configuration 1004. As such, the left side panel 1010 and the right side panel 1012 may taper outwardly in a direction going from a front of the fairing system 1000 toward a rear of the fairing system 1000. When the deployable fairing 1002 is in the retracted configuration 1100, the left and the right side panels 1010 and 1012 pivot into the back of the cab 10*c* to extend laterally with respect to the cab 10*c*, to be substantially perpendicular to the direction of travel during normal operation. In some implementations, the left and the right side panels 1010 and 1012 may be rotated inward towards the back of the cab 10*c* by a certain angle (e.g., rotated inward by about 45° from their respective locations in the deployed configuration 1004).

In some implementations when the deployable fairing 1002 is in the deployed configuration 1004, the left side panel 1010 and the right side panel 1012 may taper outwardly in a direction going from a front of the fairing system 1000 toward the rear of the fairing system, and at the same time, the deployable upper panel 1032 may be titled relatively upward from the upper horizontal axis 1042 in which the trailing edge 1040 of the deployable upper panel 1032 is positioned relatively above the leading edge 1038 of the deployable upper panel 1032. In such an implementation, an area enclosed by a perimeter defined by the deployable upper panel 1032, the left side panel 1010, and the right side panel 1012 distal from the front of the fairing system 1000 may be greater than an area enclosed by a perimeter defined by the deployable upper panel 1032, the left side panel 1010, and the right side panel 1012 proximate the front of the fairing system 1000.

Figure 7:
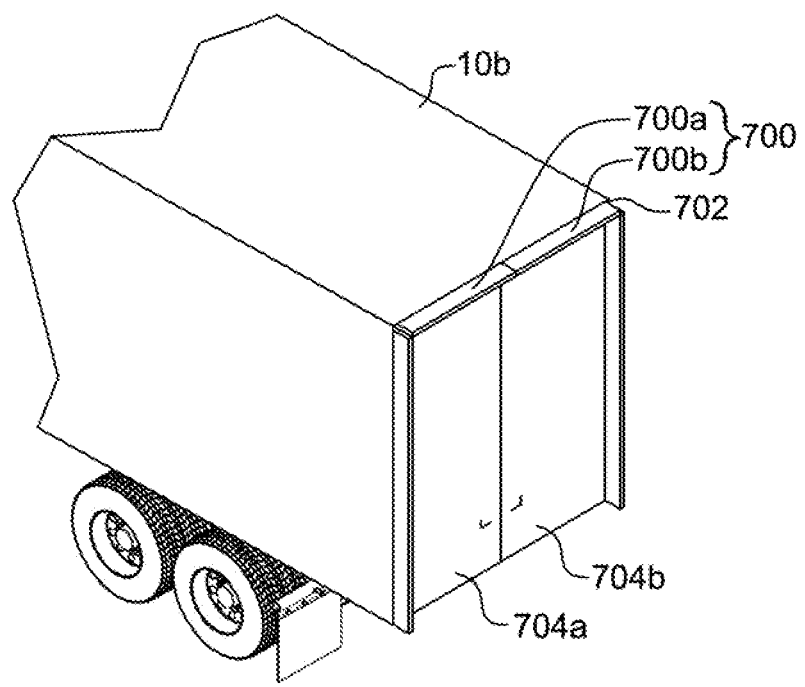
FIG. 7 is a rear, left side, isometric view of a vehicle comprising a trailer, which employs deployable faring as a tail end to improve aerodynamic efficient, according to one illustrated embodiment, the deployable faring illustrated in a fully retracted or un-deployed configuration.
Figure 8:
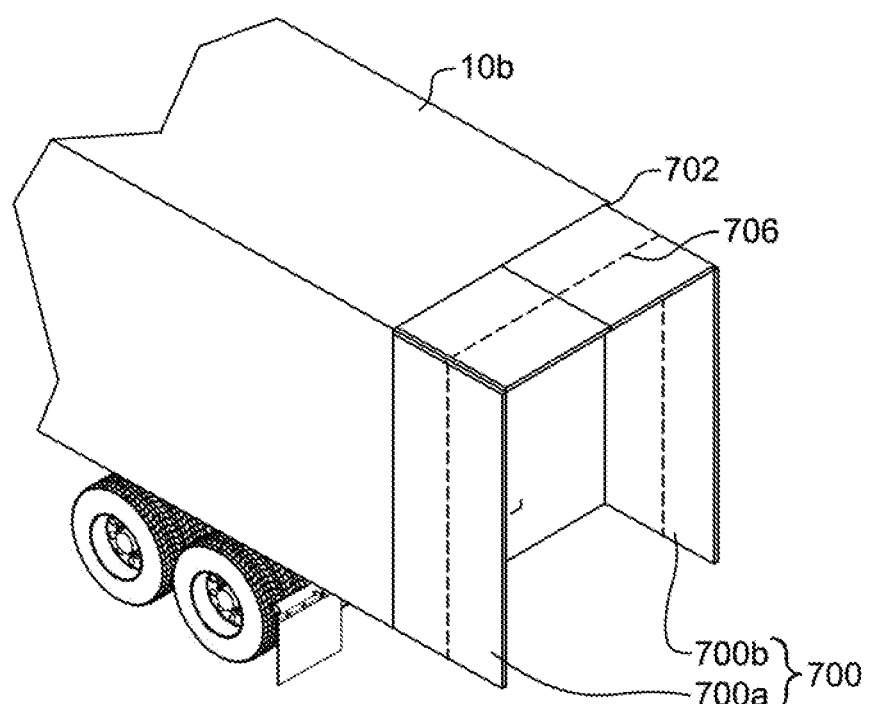
FIG. 8 is a rear, left side, isometric view of the deployable fairing of FIG. 7 in the fully extended or fully deployed configuration.

FIG. 7 shows a vehicle in the form of a trailer 10*b* having a deployable fairing 700 attached to a rear or back 702 of the trailer 10*b* according to one illustrated implementation, the deployable fairing 700 in a fully retracted or fully un-deployed configuration. FIG. 8 shows the trailer 10*b* of FIG. 7 with the deployable fairing 700 in a fully extended or fully deployed configuration.

The trailer 10*b* may, for example include a pair of doors 704*a*, 704*b* at the rear or back 702 of the trailer 10*b*, which selectively provide access to an interior of the trailer 10*b* from an exterior thereof. The deployable fairing 700 should accommodate any doors 704*a*, 704*b*. For example, the deployable fairing 700 may be provided in to distinct sections 700*a*, 700*b*, each of which can pivot or swing open and closed about respective axes with a respective one of the doors 704*a*, 704*b*. Alternatively, the entire deployable fairing 700 may be mounted to pivot or swing about a single axis.

While generally illustrated in a fully retracted or fully un-deployed configuration (FIG. 7) and in a fully extended or fully deployed configuration (FIG. 8), the deployable fairing 700 can be placed in a plurality of intermediate configurations between the fully retracted or fully un-deployed configuration (FIG. 7) and the fully extended or fully deployed configuration. One such intermediate configuration is illustrated via broken line 706 (FIG. 8).

Figure 9A:
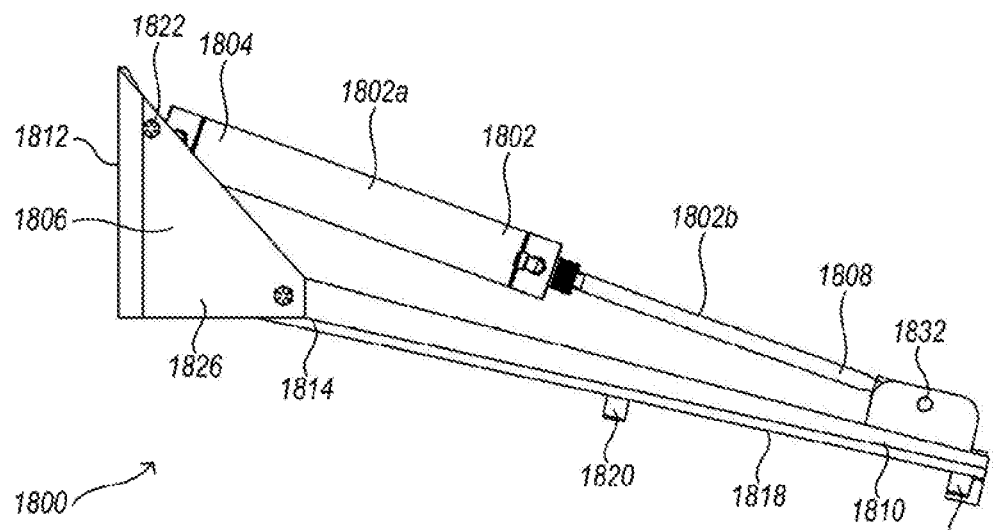
FIG. 9A is a top plan view of a hinge shown in an extended configuration in which one end of an actuator is rotatably coupled to a base of the hinge and an opposite end of the actuator is rotatably coupled to a portion of the arm of the hinge, according to at least one illustrated implementation.
Figure 9B:
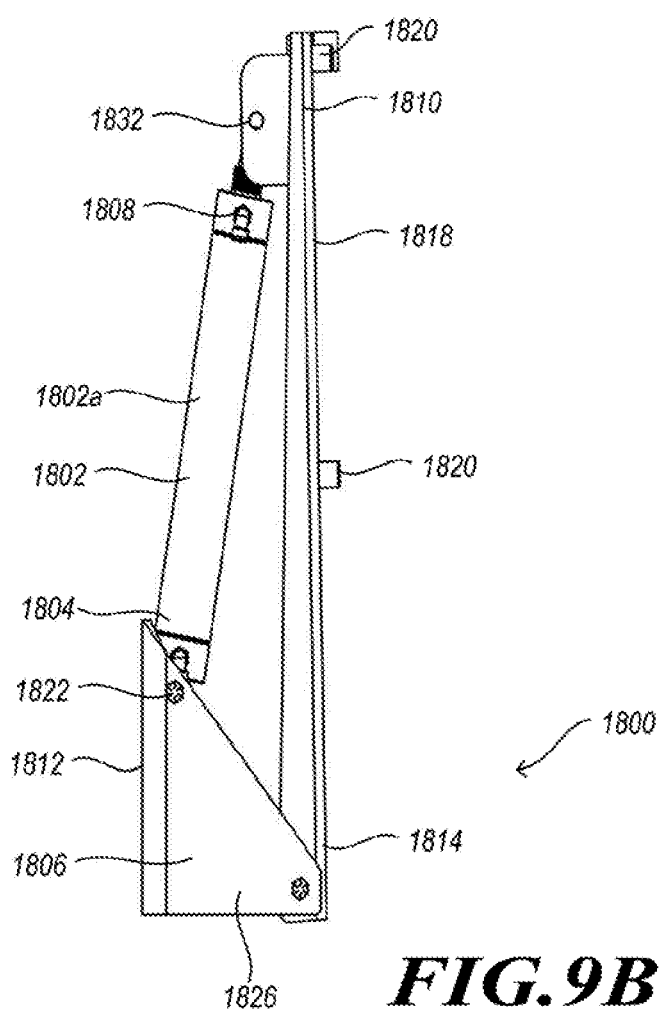
FIG. 9B is a top plan view of the side panel hinge of FIG. 9A shown in a retracted configuration, according to at least one illustrated implementation.

FIGS. 9A and 9B show a hinge 1800 comprised of a base 1806 and an arm 1810 along with a hinge actuator 1802 in which a proximal end 1804 of the hinge actuator 1802 is rotatably coupled to the base 1806 and an opposing distal end 1808 of the hinge actuator 1802 is rotatably coupled to a portion of the arm 1810, according to at least one illustrated implementation. The base 1806 of the s hinge 1800 may be physically coupled to the back of the cab 10*c* along a first surface 1812, via bolts, rivets, screws, or other similar physical coupling components. A proximal end 1814 of the arm 1810 may rotatably couple to the base 1806 and rotate about a vertical hinge axis. A distal end 1818 of the arm 1810 may physically couple to a panel or portion of a frame. In some implementations, such coupling may occur via one or more coupling features 1820 spaced along the arm 1810 in which the coupling features 1820 may be, for example, one or more posts that extend outward from the arm 1810 to engage with corresponding apertures on the panel or portion of a frame, thereby physically coupling the arm 1810 with the panel or frame member. In some implementations, coupling features 1820 may be spaced along the arm 1810 such that a proximal edge of the panel is located at least two inches from the associated base 1806. In some implementations, the coupling features 1820 may be spaced along the arm 1810 such that a proximal end of the panel is separated from the static cab fairing 17 by a distance of at least one-half inch. As such, the hinge 1800 may translate and pivot the side panel away from the back of the cab 10*c* about the vertical hinge axis when the deployable fairing system transitions to the deployed configuration from the retracted configuration.

The arm 1810 and the attached panel or portion of a frame may be rotatably translated and pivoted by the associated hinge actuator 1802. For example, a proximal end 1804 of the hinge actuator 1802 may be pivotally coupled to the base 1806 that is located proximate the back of the cab 10*c*, 10*d* via one or more hinges 1822. In some implementations, the one or more hinges 1822 may include a sleeve that extends from a first side 1826 of the base 1806 through an aperture on the proximal end 1804 of the hinge actuator 1802 to an opposing second side of the base 1806. Such a sleeve may be held in place by a screw that extends between and secured at the first side 1826 and the second side of the base 1806. This rotatable coupling to the base 1806 may enable the hinge actuator 1802 to pivot about an actuator vertical axis that extends vertically through the base 1806. A distal end 1808 of the hinge actuator 1802 may be coupled to a portion of the arm 1810 with one or more hinges 1832 at a distance from the base 1806. Such hinges 1832 enable the actuator 1802 and the arm 1810 to rotate relative to each other as the base 1806 rotates between a fully deployed configuration and a fully retracted configuration with a plurality of intermediate configurations therebeween.

In some implementations, the actuator 1802 may include a housing 1802*a* and an extendable arm 1802*b*. When the side panel hinge 1800 is in the fully retracted or fully un-deployed configuration, at least some of the extendable arm 1802*b* may be contained within the housing 1802*a*. To transition the hinge 1800 to the fully deployed configuration or an intermediate configuration (e.g., partially deployed configurations), the actuator 1802 may extend the extendable arm 1802*b* from the distal end 1808 of the actuator 1802, thereby applying an outward and rearward force on the distal end 1818 of the arm 1810 that results in the distal end 1818 of the arm 1810 and the attached panel or frame member translating and pivoting away from the back of the cab 10*c* or trailer. When the hinge 1800 is in the fully deployed configuration, the extendable arm 1802*b* may have been laterally translated fully out of one end of the housing 1802*a* to increase a length of the actuator 1802. In some implementations, when the hinge 1800 is in the fully deployed configuration, the distal end 1808 of the actuator 1802 may be located rearward and outward from the proximal end 1804 of the actuator 1802. In some implementations, one or more positional sensors may be placed along a direction of travel of the actuator 1802 and/or within the actuator 1802. Such positional sensors may include, for example, Reed switches position encoders, rotary encoders, that may be used to indicate the positions of the components being pivoted, translated, or otherwise moved by the actuators 1802. In some implementations, multiple positional sensors may be placed within the actuator 1802. Such signals from multiple positional sensors may be used to determine a rate of travel of the component(s) being moved by the actuator 1802.

Figure 10:
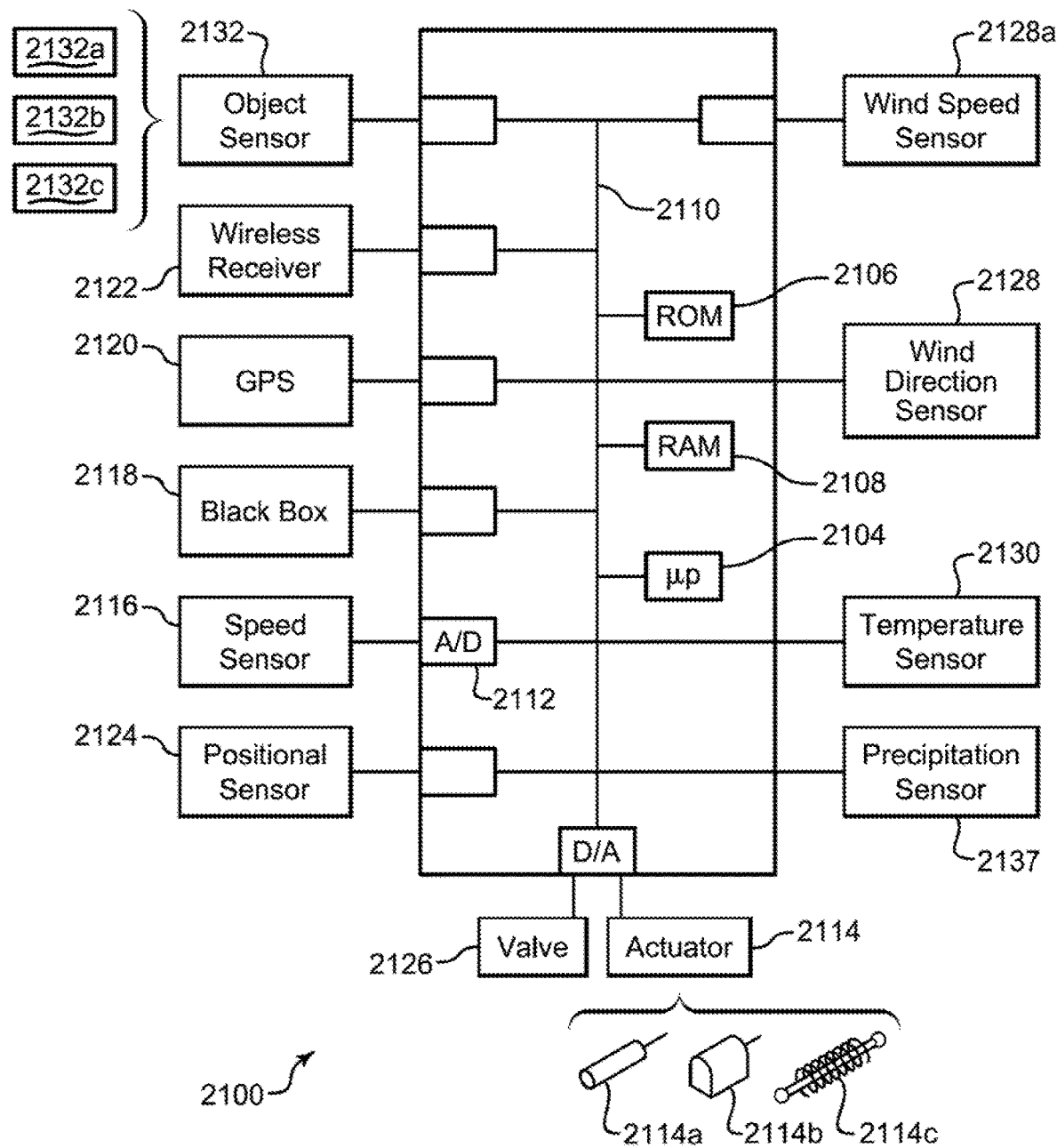
FIG. 10 is a schematic diagram of a control system for the deployable fairing system according to one illustrated implementation, the deployable fairing system operable to automatically selectively move a deployable fairing between an un-deployed configuration to a partially or fully deployed configuration based on a signal indicative or representative of a situation (e.g., presence or absence of obstacle in region of deployment) and/or other conditions (e.g., wind speed, wind direction, temperature of the ambient environment).

FIG. 10 shows a control subsystem 2100 for a deployable fairing system according to one illustrated embodiment.

The control subsystem 2100 is configured to automatically selectively move a deployable fairing 16 between a fully un-deployed or fully unextended configuration and a fully deployed or fully extended configuration, and optionally one or more partially deployed or intermediate configurations based on one or more conditions (e.g., speed of vehicle, location of vehicle, presence or absence of any obstacles in path of deployment, wind speed and/or wind direction, and/or temperature in an ambient environment.

The control subsystem 2100 may include a controller 2102. The controller 2102 may include one or more hardware or circuitry based processors (e.g., microprocessor, digital signal processor, programmable gate array, application specific integrated circuit, microcontroller) 2104. The controller 2102 may include one or more processor-readable media for example memories or other storage mediums. For example, the controller 2102 may include read only memory 2106 and/or random access memory 2108. The memories 2106, 2108 may store processor executable instructions that cause the processor 2104 to assess speed, location, or one or more thresholds, and to control a configuration or position of the deployable fairing 16 in response thereto.

The controller 2102 may include one or more busses 2110 coupling the processor 2104 and memories 2106, 2108. For example, the controller 2102 may include a power bus, instruction bus, data bus, address bus, etc. The busses may also provide signal paths to communicate with other devices or elements of the control subsystem 2100. The control subsystem 2100 may also include one or more digital-to-analog (D/A) converters 2110 to convert digital signals from the processor 2104 into an analog form suitable to drive certain components. The control subsystem 2100 may also include one or more analog-to-digital (A/D) converters 2112 to convert analog signals from certain components into a digital form suitable for processing by the processor 2104.

The control subsystem 2100 may include one or more actuators 2114 operable to move the deployable fairing 16 between the fully un-deployed or fully retracted or fully unextended configuration and the fully extend or a fully deployed configuration, and optionally into any one or more of a number of partially deployed or partially extended configurations between the fully un-deployed and fully deployed configurations. As previously explained, the actuator(s) 2114 may, for example, take the form of a piston/cylinder pair 2114*a*, a solenoid 2114*c*, and/or an electric motor (e.g., stepper motor) 2114*b*. In addition, at least one valve 2126 may be attached to or incorporated into the actuator 2114, e.g., a piston cylinder 2114*a*. The valve 2126 may be a mechanical control valve, a solenoid, or other like device that can selectively vent the actuator 2114 or provide a fluid (e.g., air, hydraulic fluid) under an elevated pressure. In the event of an error or a loss of power, the valve 2126 can be biased in the event of a power loss to deactivate the actuator 2114 such as, for example, by venting the air within a pneumatic actuator or hydraulic fluid. In this situation, the components of the deployable fairing 16 default to returning to the fully retracted or fully unextended configuration 18 as a result of the components of the deployable fairing 16 applying a downward force to the deactivated actuator 2114. In some implementations, the control subsystem 2100 may control the actuator 2114 (e.g., the left actuator 1011), such as through controlling a fluid supply, to cause the actuator 2114 to retract the left side panel 1010 to elastically deform the left side panel 1010 without causing plastic deformation to the left side panel 1010 or the deployable upper panel 1032. In some implementations, the control subsystem 2100 may control the actuator 2114 (e.g., the right actuator 1018), such as through controlling a fluid supply, to cause the actuator 2114 to retract the right side panel 1012 to elastically deform the right side panel 1012 without causing plastic deformation to the right side panel 1012 or the deployable upper panel 1032.

The valve 2126 may be biased to deactivate the actuator 2114 in various conditions, resulting in the components of the deployable fairing 16 automatically returning to the fully retracted or fully unextended configuration 18. Such conditions may arise, for example, in the event of a power loss to the vehicle 10 or to the deployable fairing system 12, or in the event that the deployable fairing system 12 is unable to communicate with the rest of the control subsystem 2100, including the processor 2104. In addition, such conditions may arise when one or more gauges or sensors indicate a potentially unsafe operating condition. Additionally or alternatively, some conditions may indicate that it may be efficient or desirable to transition the deployable fairing 16 into a partially deployed or partially extended (i.e., intermediate) configuration, for example as explained elsewhere herein.

The control subsystem 2100 may include one or more speed sensors 2116, which provide signals indicative or representative of a speed of the vehicle to the processor(s) 2104, either directly or indirectly. The speed sensor 2116 (e.g., rotational encoder, Reed switch) may be an integral part of the vehicle 10 as manufactured by the vehicle manufacturer, used as part of the speedometer of the vehicle 10. Alternatively, the speed sensor 2116 may be added later, e.g. as a retrofit. In some implementations, the speed sensor 2116 is a dedicated part of the control subsystem 2100 and is unrelated to, or not part of, the conventional feedback system (e.g., speedometer) of the vehicle 10.

The processor(s) 2104 may receive signals indicative or representative of speed from an on-board computer 2118 associated with the vehicle 10. Such on-board computers are commonly referred to as a black box. These on-board computers track various parameters of operation such as speed, distance, total time, elapsed time, and/or location. The on-board computers are typically an after-market device added to the vehicle 10 after manufacture of the vehicle 10.

The processor(s) 2104 may receive signals indicative or representative of speed from a global positioning system (GPS) receiver 2120. The (GPS) receiver 2120 may determine location information indicative or representative of a current location of the vehicle 10. The processor may be configured to associate the location information with a particular road or section of road, and hence with a posted speed limited or expected speed of travel for the vehicle 10. For example, the processor 2104 may be configured to determine whether the vehicle 10 is on a highway or a surface street based on the location information.

The processor(s) 2104 may receive signals indicative or representative of speed or location from a wireless receiver 2122. The wireless receiver 2122 may be part of the control subsystem 2100, or may be a dedicated part of the vehicle 10. The wireless receiver 2122 may determine speed information or location information indicative or representative of a current speed or location of the vehicle 10. For example, the wireless receiver 2122 may receive information indicating that the vehicle 10 is at an entrance ramp or exit ramp of a highway, or at a toll booth or toll plaza associate with an entrance or exit of a highway. Additionally, or alternatively, the information may indicate another location along a high way or surface street. The location information may itself be indicative or representative of a posted speed. Additionally or alternatively, the received information may provide a measure of the actual speed of the vehicle 10, for example as measured by radar or laser speed sensors positioned along the road. The processor may be configured to associate the location information with a particular road or section of road, and hence with a posted speed limit or expected speed of travel for the vehicle 10. For example, the processor 2104 may be configured to determine whether the vehicle 10 is on a highway or surface street based on the location information.

Additionally, the control subsystem 2100 may include one or more positional or orientation sensors 2124 which provides signals to the one or more processor(s) 2104 indicative or representative of the current positions or orientations of one or more components of the deployable fairing 16, such as, for example, the upper and lower horizontal panel assemblies 26 and 28, respectively, and the left and right side panels 30 and 32, respectively. The positional or orientation sensors 2124 may be, for example, a proximity sensor, a Reed switch, a positional encoder, a rotational encoder, an optical encoder, or other like device that can sense the position or orientation of one or more components in the deployable fairing 16. The processor(s) 2104 may be configured to determine a correct position or orientation for each of the components of the deployable fairing 16 in each of various configurations (e.g., fully retracted or fully unextended configuration 18, intermediate configurations 22, and fully deployed or fully extended configuration 20). The processor(s) 2104 may further be configured compare the current position or orientations for each component of the deployable fairing 16 as indicated by the signals received from the positional or orientation sensors 2124 with the expected configuration or position for each component of the deployable fairing 16 to identify a potential error condition. Such an error condition may arise, for example, if the current configuration or position or orientation of one or more of the components of the deployable fairing 16 differs from the expected configuration or position or orientation for the one or more components. In some implementations, a time out period, such as may be stored in memories 2106, 2108, may be used to determine if the deployable fairing 16 has successfully transitioned from the fully retracted or un-deployed configuration 18 to the fully extended or fully deployed configuration 20 or some intermediate configuration therebetween. If the processor 2104 determines that such an error condition exists (e.g., the positional sensors 2124 indicate that one or more components of the deployable fairing 16 have not reached the expected positions or orientations in the fully or partially deployed configuration 20 within the timeout period), the processor may transition the deployable fairing 16, if necessary, into the fully retracted or full un-deployed configuration 18.

The control subsystem 2100 may include one or more object sensors 2132 positioned and oriented to monitor regions in which a deployable fairing will deploy (i.e., deployed region), or alternatively encompass, when in the fully deployed or fully extended configuration. The deployed region may in some instances encompass or be encompassed by a gap region between two coupled vehicles (e.g., coupled tractor trailer combination). The deployed region may in some instances only those volumes in which a portion of the deployable fairing will reside when fully deployed or fully extended, for instance omitting a large central volume the is encompassed by the fully deployed fairing but which no fairing structure will reside. This allows a more refined determination of whether or not full deployment of the deployable fairing may cause a collision with some obstacle (e.g., structure on the trailer), where collision may result in damage to the fairing or even to the object or obstacle.

The object sensor(s) 2132 are communicatively coupled to provide signals to the processor(s) 2104, either directly or directly, indicative or representative of whether there is an object or obstacle in the deployed region. In some implementations the object sensors will determine whether an object or obstacle is present or absent from the deployed region. In some implementations the processor(s) 2104 will determine whether an object or obstacle is present or absent from the deployed region.

The object sensor(s) 2132 can any of a variety of forms. For example, the object sensor(s) 2132 can include any one or more of: distance sensors 2132a, proximity sensors 2132b, image sensors 2132c. Distance sensors may, for example, include one or more of: laser range finders, distance measuring devices or sensors. Proximity sensors may, for example, include one or more of: ultrasonic sensors, capacitive sensors, photoelectric sensors, inductive sensors or a magnetic sensors. Image sensors may, for example, include single digital cameras, binocular digital cameras, Vidicons, CMOS based image sensors, etc. It may be advantageous in some implementations to include at least one sensor of a first type of sensor and at least one sensor of a second type of sensor, the second type of sensor different from the first type of sensor.

The control subsystem 2100 may include one or more environmental sensors.

For example, the control subsystem 2100 may include one or more wind sensors 2128a, 2128 that detect wind speed, relative wind direction or both. The wind sensors 2128a, 2128 are communicatively coupled to provide signals to the processor(s) 2104 indicative or representative of wind speed (e.g., magnitude) and/or relative wind direction (e.g., cross wind relative to the vehicle). In some implementations, the wind sensors 2128a, 2128b determine the wind speed and the wind direction and provide that information to the processor(s) 2104. In other implementations, the processor(s) 2104 determines the wind speed and/or the wind direction from information provided by the wind sensors 2128a, 2128.

For example, the control subsystem 2100 may include one or more temperature sensors 2130 position to determine a temperature in an ambient environment in which the vehicle is operating. The temperature sensors can take a variety of forms, for example thermocouples. The temperature sensors 2130 are communicatively coupled to provide signals to the processor(s) 2104 indicative or representative of temperature. In some implementations, the temperature sensors 2130 determines the temperature and provides that information to the processor(s) 2104. In other implementations, the processor(s) 2104 determines the temperature from information provided by the temperature sensors 2130.

For example, the control subsystem 2100 may include one or more precipitation sensors 2137 position to determine an amount and/or direction of precipitation in an ambient environment in which the vehicle is operating. The precipitation sensors can take a variety of forms, for example rain gauges, rain sensors such as those on windshields used to activate automatic windshield wipers, radios receiving weather reports. The precipitation sensors 2137 are communicatively coupled to provide signals to the processor(s) 2104 indicative or representative of precipitation. In some implementations, the precipitation sensors 2137 determines whether there is precipitation, and amount of the precipitation and/or a direction of the precipitation and provides that information to the processor(s) 2104. In other implementations, the processor(s) 2104 determines the precipitation from information provided by the precipitation sensors 2137.

In one implementation, the processor(s) 2104 determine or selects a configuration for the deployable fairing. The configuration can be fully retracted or fully un-deployed, fully extended or fully deployed, or one or more intermediate configurations between the fully retracted or fully un-deployed and the fully extended or fully deployed configurations. The processor(s) 2104 the provide control signals, directly or indirectly, to control one or more actuators 2114. For example, the processor(s) 2104 may provide control signals directly to an interface of the actuator(s) 2114 or one or more controllers or drivers (e.g., motor controller) dedicated to controlling or driving the actuator(s) 2114. In response to the control signals, the actuator(s) 2114 move the deployable fairing into the determined or selected configuration. For instance, the actuator(s) 2114 may move the deployable fairing into one of the intermediate configurations and stop in the intermediate configuration, at least until a further assessment is made by the processor(s) 2104.

The processor(s) 2104 may use any one or more of a variety of information to determine or selects a configuration for the deployable fairing. The information will typically include information related to fuel efficiency, safety, and various other factors or conditions. A few of these are set out below as examples.

In at least one implementation, the processor(s) 2104 use information from the object sensor(s) 2132 to determine whether the deployment region has any objects or obstacles that would hinder deployment or even result in damage. Such may be assessed for example before the start of a trip, for instance when a trailer is coupled to a tractor. This approach advantageously allows the system to accommodate various styles of trailer (e.g., reefer). Additionally or alternatively, such may be assessed one or more times during a trip, for instance periodically or in response to a change in conditions. This approach advantageously allows the system to accommodate any travel in the fifth wheel.

If the processor(s) determines that any object or obstacle is present, the processor can determine that deployment of the deployable fairing should either be prevented or limited to an intermediate configuration. Such determination may be based at least in part on a position or location of the object or obstacle. Deployment into an intermediate configuration means moving the deployable fairing to the intermediate configuration, or leaving the deployable fairing in the intermediate configuration, and stopping the deployment in the intermediate configuration. This is to distinguish over simply transitorily passing through an intermediate configuration while deploying to the fully deployed or fully retracted configurations.

In some implementations, the presence or absence of an object or obstacle in the deployment region is the only factor considered in determining whether to deploy the deployable fairing and into which configuration the deployable fairing will be deployed. Thus, the processor(s) 2104 may determine to deploy the deployable fairing to an intermediate configuration that places a distal end of the deployable fairing close, but short of the object or obstacle, for example leaving a safety margin to limit or eliminate the chance of damage.

In some implementations, the determination may take into account a variety of other factors in addition or in lieu of the presence or absence of an object or obstacle in the deployment region. The factors may, for example, include various factors related to enhancing fuel efficient or safety. Factors may include vehicle speed, vehicle braking or change in vehicle speed, wind speed, wind direction and/or temperature in the ambient environment.

For example, a speed sensor 2116, discussed herein, may provide a signal indicating that the vehicle 10 is traveling at a relatively high speed, such as may occur when the vehicle 10 is traveling over a highway or freeway. Alternatively, the processor(s) 2104 may rely on location instead of, or in addition to, vehicle speed in determining whether to deploy the deployable fairing. In this situation, the processor(s) 2104 may determine if the speed indicated by the signal from the speed sensor 2116 falls above a threshold speed value stored in memories 2106, 2108 or whether a present location corresponds to a highway versus a surface street. If the speed is above the threshold or the location corresponds to a highway, the processor(s) 2104 determines to deploy the deployable faring. The extent of deployment may depend solely on the speed, or may depend on whether an object or obstacle is present in the deployment region, and/or may depend on other factors. Where the extent of deployment is based either solely on the vehicle speed or partially on the vehicle speed, the processor(s) 2104 may tend to select configurations that are more fully deployed as the speed increases. The presence of an object or obstacle in the deployment region may limit the selection. Further, there may be vehicle speeds at which anything less than full deployment would not be allowed, for instance at vehicles speeds that are so fast the deployment at an intermediate configuration could result in instability of the vehicle or damage to the deployable fairing.

The processor(s) 2104 sends signals to control the valve 2126 to activate the actuator 2114 to deploy the deployable faring into the selected configuration (e.g., fully deployed configuration, alternatively into an intermediate configuration, fully retracted configuration). In these modes of operation, the processor(s) 2104 may perform a real-time assessment of whether there is an object or obstacle in the deployment region, and/or may rely on a previously stored assessment, for instance an assessment when a trailer is first coupled to a tractor.

Also for example, the speed sensor 2116, discussed herein, may provide a signal indicating that the vehicle 10 is traveling at a low speed, such as may occur when the vehicle 10 is traveling over surface streets. Alternatively, the processor(s) 2104 may rely on location, determining that the vehicle is on a surface street or not on a highway or freeway. In this situation, the processor 2104 may determine if the speed indicated by the signal from the speed sensor 2116 falls below a threshold speed value stored in memories 2106, 2108. If the vehicle speed is below the threshold speed or the current position indicates that the vehicle is on a surface street or parking lot, then the valve 2126 may be used to cause the actuator 2114 to fully retract the deployable fairing to the fully retracted configuration or partially retract the deployable fairing to one of the intermediate configurations.

The processor 2104 may optionally receive signals from various other sensors that result in the valve 2126 being used to deactivate the deployable fairing 16, such as signals from a cross wind sensor 2128 indicating that the speed of a cross wind exceeds a cross wind threshold, or signals from a temperature sensor 2130 indicating a temperature of the environment around the actuator 2114 that falls below a low temperature threshold or exceeds a high temperature threshold, an amount and/or direction of precipitation exceeds a precipitation threshold. The processor(s) 2104 may determine whether to deploy and to select a configuration based solely or partially on any one or more of wind speed, wind direction, temperature, amount of precipitation and/or direction of precipitation in the ambient environment. In some implementations, the processor(s) 2104 may use the valve 2126 to activate or deactivate the actuator 2114.

In each instance, the processor(s) 2104 may determine to not deploy the deployable fairing or to move the deployable fairing to the fully retracted or fully un-deployed configuration is an objector or obstacle is present in the deployment region. Alternatively, the processor(s) 2104 may determine which intermediate configuration is safe in light of the presence of an object or obstacle in the deployment region, and sends signals to one or more actuators to deploy the deployable faring to the identified intermediate configuration.

The processor(s) 2104 determines which configuration is safe and efficient, and sends signals to one or more actuators to deploy the deployable faring to the selected configuration. Where the selected configuration is one of the intermediate configurations, the processor(s) 2104 stop the deployable fairing in the identified intermediate configuration, at least until a subsequent assessment. A subsequent assessment may occur periodically, or may occur in response to a change in conditions (e.g., change in vehicle speed, change in wind speed, change in wind direction, change in temperature, change in precipitation, appearance or disappearance of an object or obstacle in the deployment region).

Whether independent of object or obstacle presence or absence or independent of vehicle speed or in conjunction with vehicle speed, the processor(s) 2104 may determine to deploy the deployable fairing into a select configuration in response to wind speed, wind direction and/or temperature in the ambient environment. In each instance, the processor(s) 2104 may sense control signals to one or more actuators 2114 to cause the deployable fairing to move to, or remain in, the selected configuration (e.g., fully retracted or fully un-deployed configuration, fully extended or fully deployed configuration, intermediate configuration between the fully retracted or fully un-deployed configuration and the fully extended or fully deployed configuration), and to stop in the selected configuration at least until a subsequent assessment occurs.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and vehicles, not necessarily the exemplary automatic gap closing system on a tractor-trailer combination generally described above. For example, a gap closing system may be employed between two trailers, or between a locomotive and a car of a train, and/or between cars of a train. Also for example, the automatic gap closing system may be an integral part of one of the vehicles as the vehicle is manufactured or sold. Alternatively, the automatic gap closing system may be an aftermarket product, installed in one of the vehicles after manufacture or sale of the vehicle. The methods described herein may include additional acts, omit some acts, and/or perform some acts in a different order. One or more thresholds may be employed.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

The contents of U.S. patent application Ser. No. 12/563,426; International patent application PCT/US2017/063728; U.S. patent application Ser. No. 16/294,719, filed Mar. 6, 2019 and entitled "DEPLOYABLE FAIRING SYSTEM FOR USE WITH VEHICLES"; and U.S. Patent Application No. 62/814,725, filed Mar. 6, 2019 and entitled "DEPLOYABLE FAIRING SYSTEM FOR USE WITH VEHICLES", are each incorporated herein by reference in their entireties.

The various embodiments described above can be combined to provide further embodiments. Aspects of the embodiments can be modified, if necessary, to employ systems, circuits and concepts of the various patents, applications and publications identified herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A deployable fairing system, comprising:
a deployable fairing which is deployable into a plurality of fairing configurations from a fully retracted configuration to a fully deployed configuration, and at least one intermediate configuration between the fully retracted configuration and the fully deployed configuration;
at least one actuator drivingly coupled to move the deployable fairing into the plurality of fairing configurations;
at least one sensor position to sense at least one condition; and
a controller communicatively coupled to the at least one sensor to receive information representative of the at least one condition, and communicatively couple to control the at least one actuator in response to at least the at least one condition to deploy the deployable fairing into at least one intermediate configuration between the fully retracted configuration and the fully deployed configuration and to stop deploying the deployable faring with the deployable fairing in the at least one intermediate configuration.

2. The deployable fairing system of claim 1 wherein the deployable fairing has a proximate end and a distal end, the proximate end attached to a rear of a vehicle, the distal end spaced at least relatively proximate the rear of the vehicle in the fully retracted configuration and spaced relatively remote from the rear of the vehicle in the fully deployed configuration.

3. The deployable fairing system of claim 2 wherein the vehicle is a trailer, the proximate end of the deployable fairing attached to the rear of the trailer, the distal end of the deployable fairing extending rearwardly of the rear of the trailer as a rear tail in the intermediate and the fully deployed configurations.

4. The deployable fairing system of claim 2 wherein the vehicle is a tractor, the proximate end of the deployable fairing attached to the rear of a cab of the tractor, the distal end of the deployable fairing extending rearwardly of the rear of the cab of the tractor as a gap filler in the intermediate and the fully deployed configurations.

5. The deployable fairing system of claim 4 wherein in the fully deployed configuration the deployable fairing extends into a gap region which encompasses a volume between a back of the cab of the tractor and a front of a trailer coupled to the tractor via a fifth wheel of the tractor and a kingpin of the trailer, and which extends upwards above a set of drive wheels of the tractor.

6. The deployable fairing system of claim 4 wherein the at least one sensor is responsive to at a presence or an absence of an object in a direction in which the deployable fairing moves in transitioning toward the fully deployed configuration from the fully retracted configuration.

7. The deployable fairing system of claim 1 wherein the at least one sensor is responsive to at a presence or an absence of an object in a direction in which the deployable fairing moves in transitioning toward the fully deployed configuration from the fully retracted configuration.

8. The deployable fairing system of claim 7 wherein the controller includes at least one processor and determines presence or the absence of a portion of the trailer in the deployed region based at least in part on the information received via the at least one sensor.

9. The deployable fairing system of claim 7 wherein the controller determines the presence or the absence of one or more of a cooling unit, a heating unit or a nose cone that extends forward from a vertically extending front of the trailer into the gap region.

10. The deployable fairing system of claim 1 wherein the controller comprises at least one processor and determines an amount of deployment based at least in part on a position of an object that is present in the direction in which the deployable fairing moves in transitioning toward the fully deployed configuration from the fully retracted configuration.

11. The deployable fairing system of claim 1 wherein the controller comprises at least one processor and determines an amount of deployment based at least in part on a distance to an object that is present in the direction in which the deployable fairing moves in transitioning toward the fully deployed configuration from the fully retracted configuration to deploy the deployable fairing as close to the fully deployed configuration without contacting the object.

12. The deployable fairing system of claim 1 wherein the controller comprises at least one processor and determines an amount of deployment based at least in part on a distance to an object that is present in the direction in which the deployable fairing moves in transitioning toward the fully deployed configuration from the fully retracted configuration to deploy the deployable fairing as close to the fully deployed configuration with a defined offset without contacting the object.

13. The deployable fairing system of claim 1 wherein the at least one sensor is responsive to at least one of wind speed or wind direction.

14. The deployable fairing system of claim 1 wherein the at least one sensor is responsive to a wind direction that is non-parallel to an axis of deployment along with the deployable fairing moves in transitioning between the fully retracted and the fully deployed configurations.

15. The deployable fairing system of claim 14 wherein the controller comprises at least one processor and determines an amount of deployment based at least in part on at least one of the wind speed or the wind direction.

16. The deployable fairing system of claim 1 wherein the at least one sensor is responsive to a temperature in an ambient environment.

17. The deployable fairing system of claim 16 wherein the controller comprises at least one processor and determines an amount of deployment based at least in part on the temperature in the ambient environment.

18. The deployable fairing system of claim 16 wherein the at least one sensor is responsive to precipitation in an ambient environment the controller comprises at least one processor and determines an amount of deployment based at least in part on at least one of an amount of precipitation in the ambient environment and a direction of the precipitation in the ambient environment.

19. The deployable fairing system of claim 18 wherein the controller comprises at least one processor and determines an amount of deployment based at least in part on a desired angle of attack of at least one side panel of the deployable fairing structure.

20. The deployable fairing system of claim 1 wherein the at least one sensor comprises at least a first sensor that is responsive to at a presence or an absence of an object in a direction in which the deployable fairing moves in transitioning toward the fully deployed configuration from the fully retracted configuration, and at least a second sensor that is response to at least one of a wind speed, a wind direction, a temperature, or precipitation in an ambient environment.

21. The deployable fairing system of claim 20 wherein the controller comprises at least one processor and determines an amount of deployment based at least in part on a position of an object that is present in the direction in which the deployable fairing moves in transitioning toward the fully deployed configuration from the fully retracted configuration and based at least in part on one or more of: the wind speed, the wind direction, the temperature or the precipitation in the ambient environment.

22. A method of operation in a deployable fairing system, the deployable fairing system including: a deployable fairing which is deployable into a plurality of fairing configurations from a fully retracted configuration to a fully deployed configuration, and at least one intermediate configuration between the fully retracted configuration and the fully deployed configuration; at least one actuator drivingly coupled to move the deployable fairing into the plurality of fairing configurations; at least one sensor position to sense at least one condition; and a controller communicatively coupled to the at least one sensor to receive information representative of the at least one condition, and communicatively couple to control the at least one actuator in response to at least the at least one condition, the method comprising:

receiving by the controller information representative of the at least one condition from the at least one sensor;

determining by the controller an amount of deployment for the deployable fairing based at least one part on the received information; and providing signals by the controller to cause at least one actuator to move the deployable fairing into one of the fairing configurations that corresponds to the determined amount of deployment.

* * * * *